US012283222B2

(12) United States Patent
Jeon et al.

(10) Patent No.: US 12,283,222 B2
(45) Date of Patent: Apr. 22, 2025

(54) DRIVING CONTROLLER AND DISPLAY DEVICE INCLUDING THE SAME

(71) Applicant: Samsung Display Co., Ltd., Yongin-si (KR)

(72) Inventors: Jae-Hyeon Jeon, Yongin-si (KR); Sehyuk Park, Yongin-si (KR); Youngha Sohn, Yongin-si (KR); Jin-Wook Yang, Yongin-si (KR); Donggyu Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/118,414

(22) Filed: Mar. 7, 2023

(65) Prior Publication Data

US 2023/0401997 A1 Dec. 14, 2023

(30) Foreign Application Priority Data

Jun. 13, 2022 (KR) ........................ 10-2022-0071696

(51) Int. Cl.
*G09G 3/32* (2016.01)

(52) U.S. Cl.
CPC ....... *G09G 3/32* (2013.01); *G09G 2310/0278* (2013.01); *G09G 2320/0233* (2013.01)

(58) Field of Classification Search
CPC ............. G09G 3/32; G09G 2310/0278; G09G 2320/0233; G09G 2300/0426; G09G 2300/0814; G09G 2300/0819; G09G 2300/0866; G09G 2310/08; G09G 5/10; G09G 2300/043; G09G 2320/0626; G09G 2330/028
See application file for complete search history.

(56) References Cited

U.S. PATENT DOCUMENTS

| | | | | |
|---|---|---|---|---|
| 4,103,290 | A * | 7/1978 | Sekiguchi | H03K 21/18 324/76.59 |
| 5,668,594 | A * | 9/1997 | Cahill, III | H04N 17/04 348/E17.005 |
| 6,154,611 | A * | 11/2000 | Washisu | H04N 23/68 348/E5.046 |
| 6,441,658 | B1 * | 8/2002 | Taraci | H04N 5/126 348/E9.038 |
| 6,486,923 | B1 * | 11/2002 | Maeshima | H04N 9/30 345/589 |
| 8,692,822 | B2 * | 4/2014 | Yanagi | G09G 5/18 345/212 |
| 10,565,953 | B2 * | 2/2020 | Kim | G09G 3/3648 |

(Continued)

FOREIGN PATENT DOCUMENTS

| | | | |
|---|---|---|---|
| KR | 1020180049332 | A | 5/2018 |
| KR | 1020190138718 | A | 12/2019 |
| KR | 1020200075945 | A | 6/2020 |

*Primary Examiner* — Benyam Ketema
(74) *Attorney, Agent, or Firm* — CANTOR COLBURN LLP

(57) ABSTRACT

A display device includes a display panel including a pixel and a driving controller to drive the display panel. The driving controller generates a compensating signal, when a first driving frequency of a first frame is determined as being higher than a second driving frequency of a second frame by comparing a first cycle count value of the first frame with a second cycle count value of the second frame subsequent to the first frame.

32 Claims, 18 Drawing Sheets

(56) References Cited

U.S. PATENT DOCUMENTS

| | | | | |
|---|---|---|---|---|
| 11,037,506 | B2 * | 6/2021 | Noh | G09G 3/3233 |
| 11,158,266 | B2 * | 10/2021 | Baek | G09G 3/3233 |
| 2007/0019110 | A1 * | 1/2007 | Cho | H04N 5/44 348/554 |
| 2009/0237391 | A1 * | 9/2009 | Yanagi | G09G 5/18 345/99 |
| 2009/0295779 | A1 * | 12/2009 | Yanagi | G09G 3/3677 345/204 |
| 2010/0164941 | A1 * | 7/2010 | Chae | H04B 15/02 345/99 |
| 2014/0015819 | A1 * | 1/2014 | Yamazaki | G09G 3/3655 345/209 |
| 2015/0145900 | A1 * | 5/2015 | Lee | G09G 3/3648 345/691 |
| 2015/0333620 | A1 * | 11/2015 | Xi | H02M 3/07 345/215 |
| 2016/0035297 | A1 * | 2/2016 | Oh | G09G 5/006 345/94 |
| 2019/0341004 | A1 * | 11/2019 | Satpute | G09G 5/12 |
| 2019/0378459 | A1 * | 12/2019 | Kim | G09G 3/3291 |
| 2020/0066215 | A1 * | 2/2020 | Koo | G09G 3/3426 |
| 2020/0090619 | A1 * | 3/2020 | Wang | G09G 3/20 |
| 2020/0118517 | A1 * | 4/2020 | Park | G09G 5/14 |
| 2020/0211475 | A1 * | 7/2020 | Park | G09G 3/3275 |
| 2020/0226980 | A1 * | 7/2020 | Park | G09G 3/3258 |
| 2021/0049965 | A1 * | 2/2021 | Jeon | G09G 3/3233 |
| 2021/0124439 | A1 * | 4/2021 | Yeom | G06F 3/04162 |
| 2021/0248961 | A1 * | 8/2021 | Yang | G09G 3/3233 |
| 2021/0390919 | A1 * | 12/2021 | Ishihara | G09G 3/3614 |
| 2022/0270542 | A1 * | 8/2022 | Park | G09G 3/32 |
| 2022/0293025 | A1 * | 9/2022 | Lee | G09G 3/035 |
| 2022/0351659 | A1 * | 11/2022 | Kwon | G09G 3/3266 |
| 2023/0086857 | A1 * | 3/2023 | Lee | G09G 3/3233 345/625 |
| 2023/0117873 | A1 * | 4/2023 | Kim | G09G 3/32 345/55 |
| 2023/0306905 | A1 * | 9/2023 | Park | G09G 3/3233 |
| 2023/0386390 | A1 * | 11/2023 | Park | G09G 3/3233 |
| 2023/0410723 | A1 * | 12/2023 | Park | G09G 3/3233 |
| 2023/0410741 | A1 * | 12/2023 | Lee | G09G 3/3233 |
| 2024/0013724 | A1 * | 1/2024 | Lee | G09G 3/3233 |
| 2024/0046851 | A1 * | 2/2024 | Liu | G09G 3/3648 |
| 2024/0143114 | A1 * | 5/2024 | Ko | G09G 3/3275 |

* cited by examiner

DRIVING CONTROLLER AND DISPLAY DEVICE INCLUDING THE SAME

This application claims priority to Korean Patent Application No. 10-2022-0071696 filed on Jun. 13, 2022, and all the benefits accruing therefrom under U.S.C. § 119, the content of which in its entirety is herein incorporated by reference.

BACKGROUND

1. Field

Embodiments of the disclosure disclosed herein relate to a driving controller which compensates for brightness, and a display device having improved image quality.

2. Description of the Related Art

An emissive display device of display devices displays an image by a light-emitting diode that emits a light, as electrons and holes are recombined with each other. The emissive display device has a rapid response speed and is driven with lower power consumption. The emissive display device includes pixels connected to data lines and scan lines. Each pixel typically includes a light-emitting diode and a pixel circuit to control an amount of current flowing through the light-emitting diode. The pixel circuit controls an amount of current flowing through the light-emitting element in response to a data signal. In this case, light having predetermined brightness is generated to correspond to the amount of the current flowing through the light-emitting diode.

SUMMARY

Embodiments of the disclosure provide a driving controller which compensates for brightness.

Embodiments of the disclosure provide a display device having improved image quality by compensating for brightness.

In an embodiment of the disclosure, a display device includes a display panel including a pixel, and a driving controller which drives the display panel. The driving controller generates a compensating signal, when a first driving frequency of a first frame is determined as being higher than a second driving frequency of a second frame by comparing a first cycle count value of the first frame with a second cycle count value of the second frame subsequent to the first frame.

In an embodiment, the driving controller may acquire the first cycle count value by counting a cycle reference signal corresponding to a first period of a vertical synchronization signal for the first frame; and acquire the second cycle count value by counting a cycle reference signal corresponding to a second period of the vertical synchronization signal for the second frame.

In an embodiment, the pixel may include a pixel circuit and a light-emitting element connected to the pixel circuit, the pixel may receive a plurality of scan signals, a light-emitting control signal, a plurality of driving voltages, and a data signal, and the plurality of driving voltages may include a first driving voltage, a second driving voltage, a first initialization voltage, and a second initialization voltage.

In an embodiment, an off-duty ratio of the light-emitting control signal may be controlled through the compensating signal.

In an embodiment, an off-duty ratio of the light-emitting control signal for the first frame may be equal to an off-duty ratio of the light-emitting control signal for the second frame, when a difference between the second cycle count value and the first cycle count value is less than '1', and the off-duty ratio of the light-emitting control signal for the second frame may be higher than the off-duty ratio of the light-emitting control signal for the first frame, when a difference between the second cycle count value and the first cycle count value is equal to or greater than '1'.

In an embodiment, off-duty ratios of the light-emitting control signal in cycles of the second frame may be equal to each other, when the difference between the second cycle count value and the first cycle count value is equal to or greater than '1'.

In an embodiment, off-duty ratios of the light-emitting control signal in cycles of the second frame may be increased, when the difference between the second cycle count value and the first cycle count value is equal to or greater than '1'.

In an embodiment, the pixel circuit may include an initialization transistor connected between a voltage line for providing the second initialization voltage and the light-emitting element. The plurality of scan signals may include an initialization transmission signal, and the initialization transistor may have an operation controlled in response to the initialization transmission signal.

In an embodiment, an on-duty ratio of the initialization transmission signal may be controlled through the compensating signal.

In an embodiment, an on-duty ratio of the initialization transmission signal for the first frame may be equal to an on-duty ratio of the initialization transmission signal for the second frame, when a difference between the second cycle count value and the first cycle count value is less than '1', and the on-duty ratio of the initialization transmission signal for the second frame may be higher than the on-duty ratio of the initialization transmission signal for the first frame, when the difference between the second cycle count value and the first cycle count value is equal to or greater than '1'.

In an embodiment, on-duty ratios of the initialization transmission signal in cycles of the second frame may be equal to each other, when the difference between the second cycle count value and the first cycle count value is equal to or greater than '1'.

In an embodiment, on-duty ratios of the initialization transmission signal in cycles of the second frame may be increased, when the difference between the second cycle count value and the first cycle count value is equal to or greater than '1'.

In an embodiment, a level of the second initialization voltage may be controlled through the compensating signal.

In an embodiment, a level of the second initialization voltage in the first frame may be equal to a level of the second initialization voltage in the second frame, when a difference between the second cycle count value and the first cycle count value is less than '1', and the level of the second initialization voltage in the second frame may be lower than the level of the second initialization voltage in the first frame, when the difference between the second cycle count value and the first cycle count value is equal to or greater than '1'.

In an embodiment, levels of the second initialization voltage in cycles of the second frame may be equal to each other, when the difference between the second cycle count value and the first cycle count value is equal to or greater than ‘1’.

In an embodiment, levels of the second initialization voltage in cycles of the second frame may be reduced, when the difference between the second cycle count value and the first cycle count value is equal to or greater than ‘1’.

In an embodiment, the plurality of driving voltages further may include a bias voltage, the pixel circuit may include a driving transistor, and a bias transistor connected between a node between the driving transistor and a line for providing the first driving voltage, and a voltage line for providing the bias voltage, and a level of the bias voltage or a time duration to apply the bias voltage may be controlled through the compensating signal.

In an embodiment, a level of a bias voltage in the first frame may be equal to a level of a bias voltage in the second frame, when a difference between the second cycle count value and the first cycle count value is less than ‘1’, and the level of the bias voltage in the second frame may be higher than the level of the bias voltage in the first frame, when the difference between the second cycle count value and the first cycle count value is equal to or greater than ‘1’, In an embodiment, levels of the bias voltage in cycles of the second frame may be equal to each other or are increased, when the difference between the second cycle count value and the first cycle count value is equal to or greater than ‘1’.

In an embodiment, a time duration to apply the bias voltage in the first frame may be equal to a time duration to apply the bias voltage in the second frame, when the difference between the second cycle count value and the first cycle count value is less than ‘1’, and the time duration to apply the bias voltage in the second frame may be longer than the time duration to apply the bias voltage in the first frame, when the difference between the second cycle count value and the first cycle count value is equal to or greater than ‘1’.

In an embodiment, the driving controller may include a cycle counter to acquire the first cycle count value and the second cycle count value, a look-up table having a compensating value stored based on the first cycle count value and the second cycle count value, and a compensating signal generator to generate the compensating signal, based on the compensating value.

In an embodiment, a driving controller may include a cycle counter to count a cycle of each of a plurality of frames, a look-up table having a compensating value stored based on a cycle count value provided from the cycle counter, and a compensating signal generator to generate a compensating signal based on the compensating value.

In an embodiment, the cycle counter may acquire a first cycle count value by counting a cycle reference signal corresponding to a first period of a vertical synchronization signal for a first frame; acquire a second cycle count value by counting a cycle reference signal corresponding to a second period of the vertical synchronization signal for a second frame; and output the first cycle count value and the second cycle count value.

In an embodiment, the driving controller may include a computing unit to acquire a delta value by subtracting the first cycle count value from the second cycle count value. The compensating value corresponding to the delta value is stored in the look-up table.

In an embodiment, the compensating signal may control at least one of a light-emitting control signal, an initialization voltage, and a bias voltage provided to a display panel.

In an embodiment, the compensating signal may increase an off-duty ratio of the light-emitting control signal.

In an embodiment, the compensating signal may decrease a level of the initialization voltage.

In an embodiment, the compensating signal may increase a time duration to apply the initialization voltage.

In an embodiment, the compensating signal may increase a level of the bias voltage.

In an embodiment, the compensating signal may increase a time duration to apply the bias voltage.

In an embodiment of the disclosure, a display device includes a display panel to display an image of a first frame and a second frame subsequent to the first frame, and receives at least one of a light-emitting control signal, an initialization voltage, and a bias voltage, and a driving controller to generate a compensating signal which controls brightness, when a second cycle count value, which is obtained by counting cycles included in the second frame, is greater than a first cycle count value obtained by counting cycles included in the first frame. The compensating signal is a signal which controls at least one of the light-emitting control signal, the initialization voltage, and the bias voltage.

In an embodiment, the compensating signal may be at least one of a signal which increases an off-duty ratio of the light-emitting control signal, a signal which decreases a level of the initialization voltage, a signal which increases a time duration to apply the initialization voltage, a signal which increases a level of the bias voltage, and a signal which increases a time duration to apply the bias voltage.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
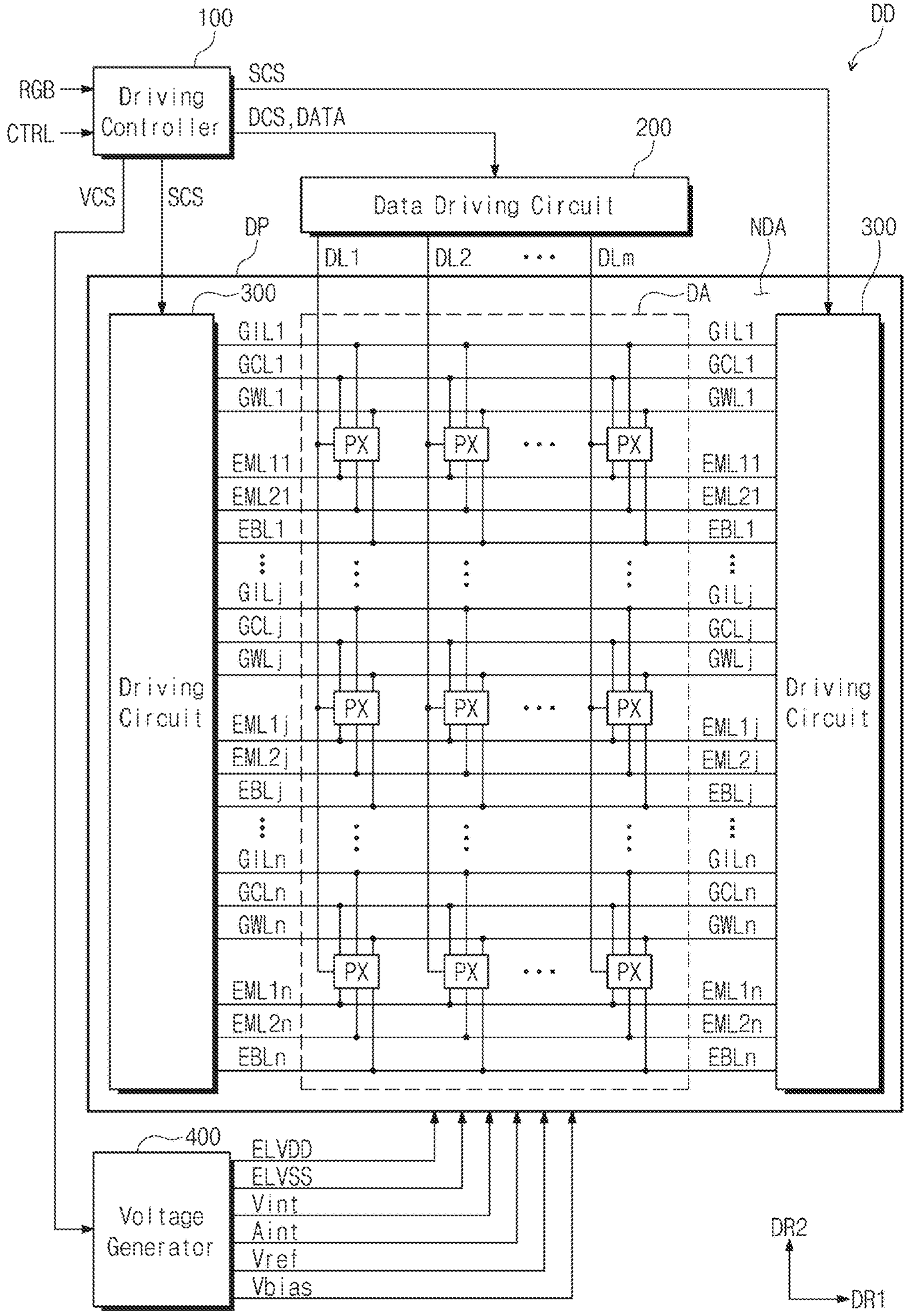
FIG. 1 is a block diagram of an embodiment of a display device, according to the disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

In addition, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "part" and "unit" mean a software component or a hardware component that performs a predetermined function. The hardware component may include, for example, a field-programmable gate array ("FPGA") or an application-specific integrated circuit ("ASIC"). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays or variables.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a block diagram of an embodiment of a display device DD, according to the disclosure.

Referring to FIG. 1, the display device DD may include a display panel DP, a driving controller 100, and a panel driver. In an embodiment of the disclosure, the panel driver may include a data driving circuit 200 (or a data driver), driving circuits 300, and a voltage generator 400.

The display panel DP may include a display region DA and a non-display region NDA. The display panel DP may include a plurality of pixels PX disposed in the display region DA. Each of the plurality of pixels PX may include a light-emitting element ED (refer to FIG. 2) and a pixel circuit PXC (refer to FIG. 2) to control a light-emitting operation of the light-emitting element ED. The pixel circuit PXC may include at least one transistor and at least one capacitor.

The display panel DP further includes initialization scan lines GIL1 to GILn, compensation scan lines GCL1 to GCLn, write scan lines GWL1 to GWLn, bias scan lines EBL1 to EBLn, first light-emitting control lines EML11 to EML1*n*, second light-emitting control lines EML21 to EML2*n*, and data lines DL1 to DLm. Here, m and n are natural numbers.

The display panel DP may operate in a first mode in which the display panel DP is driven at a predetermined driving frequency, e.g., about 60 hertz (Hz), about 120 Hz, or about 240 Hz, or a second mode in which the display panel DP is driven at a variable driving frequency. In an embodiment, although the variable driving frequency may be variously modified within the range of about 1 Hz to about 240 Hz, the frequency range is not particularly limited to the above example, for example.

When the display panel DP operates in the second mode, the driving frequency of the display panel DP may have a duration in which the driving frequency is changed from a higher frequency to a lower frequency. In an embodiment, the display panel DP driven at the frequency of about 240 Hz may be driven at about 48 Hz in a next frame, for example. In this case, in an image having the same grayscale and displayed on the display panel DP, brightness may be increased depending on a change in the driving frequency, due to the hysteresis characteristic of a first transistor T1 (refer to FIG. 2) included in a pixel PX.

According to the disclosure, the display device DD may detect the change in driving frequency between a previous frame and a current frame, and may compensate for brightness based on the change in the driving frequency. Accordingly, the change in brightness resulting from the change in the driving frequency may be reduced or removed, thereby improving the display quality of the display device DD.

The driving controller 100 receives an image signal RGB and a control signal CTRL. The driving controller 100 generates an image data signal DATA by transforming a data format of the image signal RGB to be matched to the interface specification of the data driving circuit 200. The driving controller 100 may output a first control signal SCS, a second control signal DCS, and a third control signal VCS.

In an embodiment of the disclosure, the first control signal SCS may include a signal for controlling a time point to apply a second initialization voltage Aint, a time point to apply a bias voltage Vbias, or off duty ratios of signals provided to the first light-emitting control lines EML11 to EML1*n*, and the second light-emitting control lines EML21 to EML2*n*.

In an embodiment of the disclosure, the third control signal VCS may include a signal for adjusting the level of the second initialization voltage Aint or the level of the bias voltage Vbias. Accordingly, the voltage generator 400 may output the second initialization voltage Aint or the bias voltage Vbias by adjusting the level of the second initialization voltage Aint or the level of the bias voltage Vbias based on the third control signal VCS.

The data driving circuit 200 receives the second control signal DCS and the image data signal DATA from the driving controller 100. The data driving circuit 200 transforms the image data signal DATA into data signals and outputs the data signals to the data lines DL1 to DLm. The data signals are analog voltages corresponding to a grayscale value of the image data signal DATA. The data lines DL1 to DLm may be arranged in a first direction DR1 and each of the data lines DL1 to DLM may extend in a second direction DR2.

The driving circuit 300 may be disposed in the non-display region NDA of the display panel DP, but the disclosure is not limited thereto. In an embodiment, at least a portion of the driving circuit 300 may be disposed in the display region DA, for example. The driving circuits 300 may include transistors formed through the same process as that of the pixel circuit PXC (refer to FIG. 2).

The driving circuit 300 may receive the first control signal SCS and may output a scan signal or a light-emitting control signal to the initialization scan lines GIL1 to GILn, the compensation scan lines GCL1 to GCLn, the write scan lines GWL1 to GWLn, the bias scan lines EBL1 to EBLn, the first light-emitting control lines EML11 to EML1*n*, and the second light-emitting control lines EML21 to EML2*n*.

A plurality of driving circuits 300 may be provided. In an embodiment, the plurality of driving circuits 300 may be spaced apart from each other while the display region DA is interposed between the plurality of driving circuits 300, for example. The initialization scan lines GIL1 to GILn, the compensation scan lines GCL1 to GCLn, the write scan lines GWL1 to GWLn, the bias scan lines EBL1 to EBLn, the first light-emitting control lines EML11 to EML1*n*, and the second light-emitting control lines EML21 to EML2*n* may be electrically connected to the driving circuits 300 and may receive signals from the driving circuits 300. In an embodiment, one initialization scan line GILL one compensation scan line GCL1, one write scan line GWL1, one bias scan line EBL1, one first light-emitting control line EML11, one second light-emitting control line EML21 may receive the same signal from two driving circuits 300, for example. However, this is provided only for the illustrative purpose, and one of two driving circuits 300 illustrated in FIG. 1 may be omitted.

Each of the driving circuits 300 may include a scan driving circuit connected to the initialization scan lines GIL1 to GILn, the compensation scan lines GCL1 to GCLn, the write scan lines GWL1 to GWLn, and the bias scan lines EBL1 to EBLn, and a light-emitting control driving circuit connected to the first light-emitting control lines EML11 to EML1*n*, and the second light-emitting control lines EML21 to EML2*n*.

The initialization scan lines GIL1 to GILn, the compensation scan lines GCL1 to GCLn, the write scan lines GWL1 to GWLn, the bias scan lines EBL1 to EBLn, the first light-emitting control lines EML11 to EML1*n*, and the second light-emitting control lines EML21 to EML2*n* may individually extend in the first direction DR1 and may be spaced apart from each other in the second direction DR2.

Each of the plurality of pixels PX may be electrically connected to four scan lines, two light-emitting control lines, and one data line. In an embodiment, as illustrated in FIG. 1, a first row of pixels may be connected to the scan lines GIL1, GCL1, GWL1, and EBL1, and the first and second light-emitting control lines EML11 and EML21, for example. In an embodiment, the first row of pixels may be connected to the data line DL1, for example. In addition, the j-th row of pixels may be connected to the scan lines GILj, GCLj, GWLj, and EBLj and the first and second light-emitting control line EML1*j* and EML2*j*.

The voltage generator 400 generates voltages desired for the operation of the display panel DP. In an embodiment, the voltage generator 400 may generate a first driving voltage ELVDD, a second driving voltage ELVSS, a first initialization voltage Vint, the second initialization voltage Aint, a reference voltage Vref, and the bias voltage Vbias.

Figure 2:
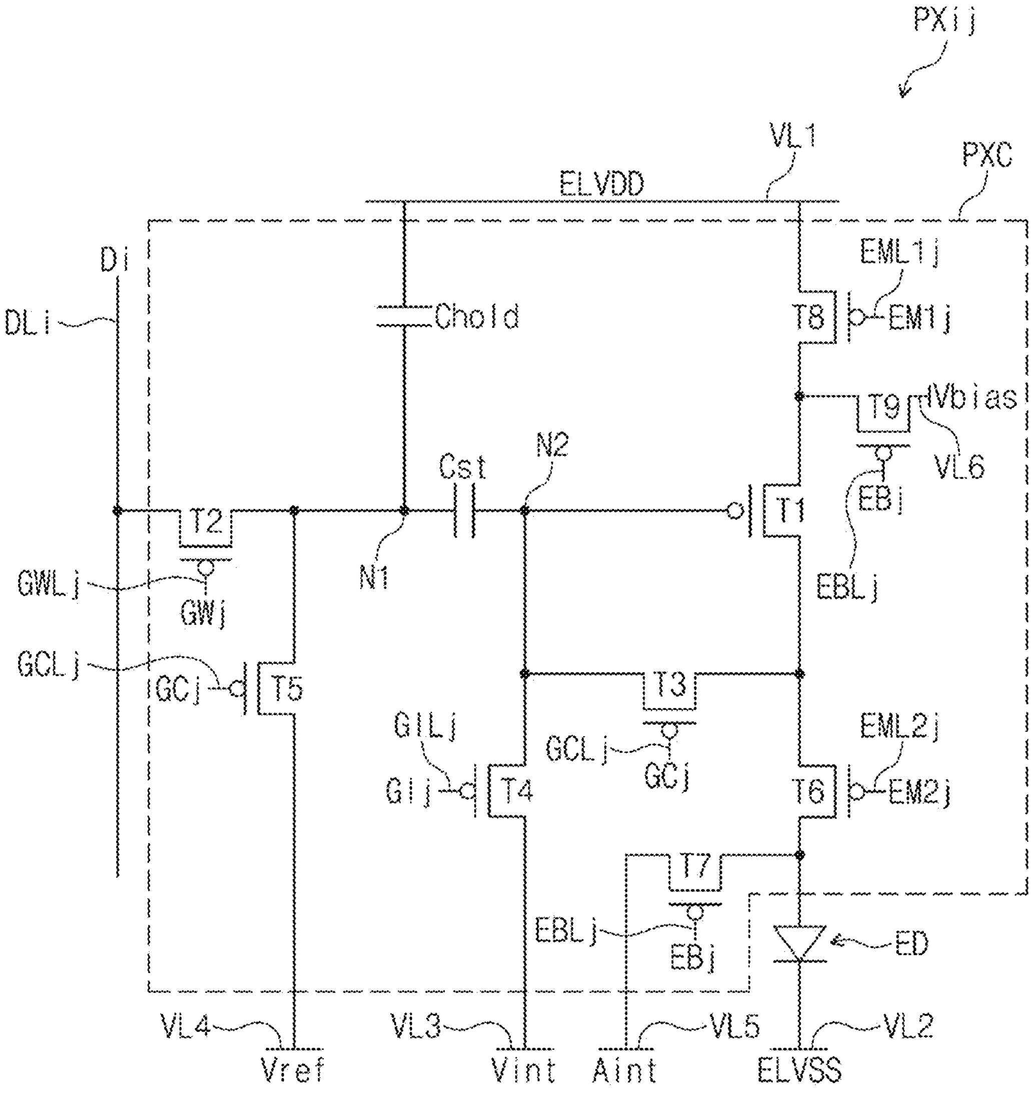
FIG. 2 is a circuit diagram of an embodiment of a pixel, according to the disclosure.

FIG. 2 is a circuit diagram of an embodiment of a pixel PXij according to the disclosure. Here, i and j may be natural numbers equal to or less than n and m, respectively.

Referring to FIGS. 1 and 2, the pixel PXij may be connected to the j-th initialization scan line GILj, the j-th compensation scan line GCLj, the j-th write scan line GWLj, the j-th bias scan line EBLj, the j-th first light-emitting control line EML1*j*, the j-th second light-emitting control line EML2*j*, and the i-th data line DLi. Each of the plurality of pixels PX illustrated in FIG. 1 may have the same configuration as that of the pixel PXij illustrated in FIG. 2.

In an embodiment of the disclosure, the pixel PXij includes the pixel circuit PXC and at least one light-emitting element ED. The pixel circuit PXC may include first to ninth transistors T1, T2, T3, T4, T5, T6, T7, T8, and T9, a first capacitor Cst, and a second capacitor Chold.

Each of the first to ninth transistors T1, T2, T3, T4, T5, T6, T7, T8, and T9 may be a P-type thin film transistor having a silicon semiconductor layer, e.g., a low-temperature polycrystalline silicon ("LTPS") semiconductor layer. However, the disclosure is not limited thereto. Some of the first to ninth transistors T1, T2, T3, T4, T5, T6, T7, T8, and T9 may be N-type transistors having a semiconductor layer including an oxide semiconductor, and remaining transistors of the first to ninth transistors T1 to T9 may be P-type transistors. In an embodiment, all the first to ninth transistors T1, T2, T3, T4, T5, T6, T7, T8, and T9 may be N-type transistors.

The j-th initialization scan line GILj may transmit an initialization scan signal GIj, the j-th compensation scan line GCLj may transmit a compensation scan signal GCj, the j-th write scan line GWLj may transmit a write scan signal GWj, a j-th bias scan line EBLj may transmit a bias scan signal EBj (or referred to as a "initialization transmission signal"), the j-th first light-emitting control line EML1*j* may transmit a first light-emitting control signal EM1j, the j-th second light-emitting control line EML2j may transmit a second light-emitting control signal EM2j, and an i-th data line DLi may transmit a data signal Di. The data signal Di may have a voltage level corresponding to the grayscale value of the image data signal DATA output from the driving controller 100.

In addition, the pixel PXij may be connected to first to sixth driving voltage lines VL1, VL2, VL3, VL4, VL5, and VL6. The first driving voltage line VL1 may transmit the first driving voltage ELVDD. The second driving voltage line VL2 may transmit the second driving voltage ELVSS. The third driving voltage line VL3 may transmit the first initialization voltage Vint and may be also referred to as a first initialization voltage line. The fourth driving voltage line VL4 may transmit the reference voltage Vref and may be also referred to as a reference voltage line. The fifth driving voltage line VL5 may transmit the second initialization voltage Aint and may be also referred to as a second initialization voltage line. The sixth driving voltage line VL6 may transmit the bias voltage Vbias and may be also referred to as a bias voltage line.

The first capacitor Cst may be connected between a first node N1 and a second node N2, and the second capacitor Chold may be connected between the first node N1 and the first driving voltage line VL1.

The first transistor T1 includes a first electrode electrically connected to the first driving voltage line VL1 through the eighth transistor T8, a second electrode electrically connected to an anode of the light-emitting element ED through the sixth transistor T6, and a gate electrode connected to the second node N2. The first transistor T1 may be also referred to as a driving transistor.

The second transistor T2 includes a first electrode connected to the data line DLi, a second electrode connected to the first node N1, and a gate electrode connected to the j-th write scan line GWLj. The second transistor T2 may be turned on in response to the write scan signal GWj received through the j-th write scan line GWLj and may transmit the data signal Di received through the data line DLi to the first node N1. The second transistor T2 may be also referred to as a switching transistor.

The third transistor T3 includes a first electrode connected to the second electrode of the first transistor T1, a second electrode connected to the second node N2, that is, the gate electrode of the first transistor T1, and a gate electrode connected to the j-th compensation scan line GCLj. The third transistor T3 may be turned on in response to the compensation scan signal GCj received through the j-th compensation scan line GCLj to connect the gate electrode of the first transistor T1 and the second electrode of the first transistor T1 to each other.

The fourth transistor T4 includes a first electrode connected to the second node N2, a second electrode connected to the third driving voltage line VL3, and a gate electrode connected to the j-th initialization scan line GILj. The fourth transistor T4 may be turned on in response to the initialization scan signal GIj received through the j-th initialization scan line GILj to transmit the first initialization voltage Vint to the gate electrode of the first transistor T1 to initialize the voltage of the gate electrode of the first transistor T1.

The fifth transistor T5 includes a first electrode connected to the first node N1, a second electrode connected to the fourth driving voltage line VL4, and a gate electrode connected to the j-th compensation scan line GCLj. The fifth transistor T5 may be turned on in response to the compensation scan signal GCj received through the j-th compensation scan line GCLj to transmit the reference voltage Vref to the first node N1.

The sixth transistor T6 includes a first electrode connected to the second electrode of the first transistor T1, a second electrode connected to the anode of the light-emitting element ED, and a gate electrode connected to the j-th second light-emitting control line EML2j. The sixth transistor T6 may be turned on in response to the second light-emitting control signal EM2j received through the j-th second light-emitting control line EML2j.

The seventh transistor T7 includes a first electrode connected to the anode of the light-emitting element ED, a second electrode connected to the fifth driving voltage line VL5, and a gate electrode connected to the j-th bias scan line EBLj. The seventh transistor T7 may be turned on in response to the bias scan signal EBj received through the j-th bias scan line EBLj to connect the fifth driving voltage line VL5, to which the second initialization voltage Aint is provided, to the light-emitting element ED. The bias scan signal EBj may be also referred to as an initialization transmission signal EBj, and the seventh transistor T7 may be also referred to as the initialization transistor T7.

The eighth transistor T8 includes a first electrode connected to the first driving voltage line VL1, a second electrode connected to the first electrode of the first transistor T1, and a gate electrode connected to the j-th first light-emitting control line EML1j. The eighth transistor T8 may be turned on in response to the first light-emitting control signal EM1j received through the j-th first light-emitting control line EML1j. As the sixth transistor T6 and the eighth transistor T8 are turned on, a current path may be formed between the first driving voltage line VL1 and the light-emitting element ED through the eighth transistor T8, the first transistor T1, and the sixth transistor T6.

The ninth transistor T9 may be connected between a node between the first transistor T1 and the first driving voltage line VL1 to which the first driving voltage ELVDD is provided and a sixth driving voltage line VL6 to which the bias voltage Vbias is provided. The ninth transistor T9 includes a first electrode connected to the sixth driving voltage line VL6, a second electrode connected to the first electrode of the first transistor T1, and a gate electrode connected to the j-th bias scan line EBLj. The ninth transistor T9 may be turned on in response to the bias scan signal EBj received through the j-th bias scan line EBLj to transmit the bias voltage Vbias to the first electrode of the first transistor T1. The ninth transistor T9 may be also referred to as a bias transistor.

The light-emitting element ED may be a light-emitting diode. In an embodiment, although the above description is made in that one pixel PXij includes one light-emitting element ED, the disclosure is not particularly limited thereto. In an embodiment, one pixel PXij may be connected to a plurality of light-emitting elements connected to each other in parallel or in series. The light-emitting element ED includes an anode connected to the second electrode of the sixth transistor T6 and a cathode connected to the second driving voltage line VL2.

Figure 3:
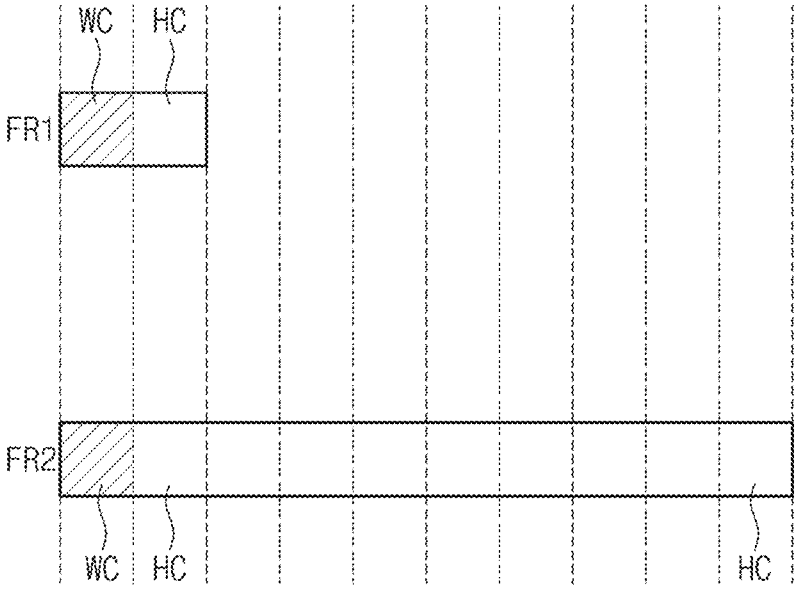
FIG. 3 is a view illustrating an embodiment of cycles included in a first frame and a second frame, according to the disclosure.

FIG. 3 is a view illustrating an embodiment of cycles included in a first frame FR1 and a second frame FR2, according to the disclosure.

Referring to FIG. 3, the driving frequency of the first frame FR1 and the driving frequency of the second frame FR2 may be different from each other. In an embodiment, the driving frequency of the first frame FR1 illustrated in FIG. 3 may be about 240 Hz, and the driving frequency of the second frame FR2 may be about 48 Hz, for example.

Each of the first frame FR1 and the second frame FR2 may include a plurality of cycles. In an embodiment, the first frame FR1 shows a frame operating at the maximum driving frequency, and the first frame FR1 may include one data write cycle WC and one hold cycle HC, for example. The second frame FR2 may include one data write cycle WC and nine hold cycles HC. In the hold cycle HC, the pixel PXij (refer to FIG. 2) may emit light to correspond to data written in the data write cycle WC.

Figure 4:
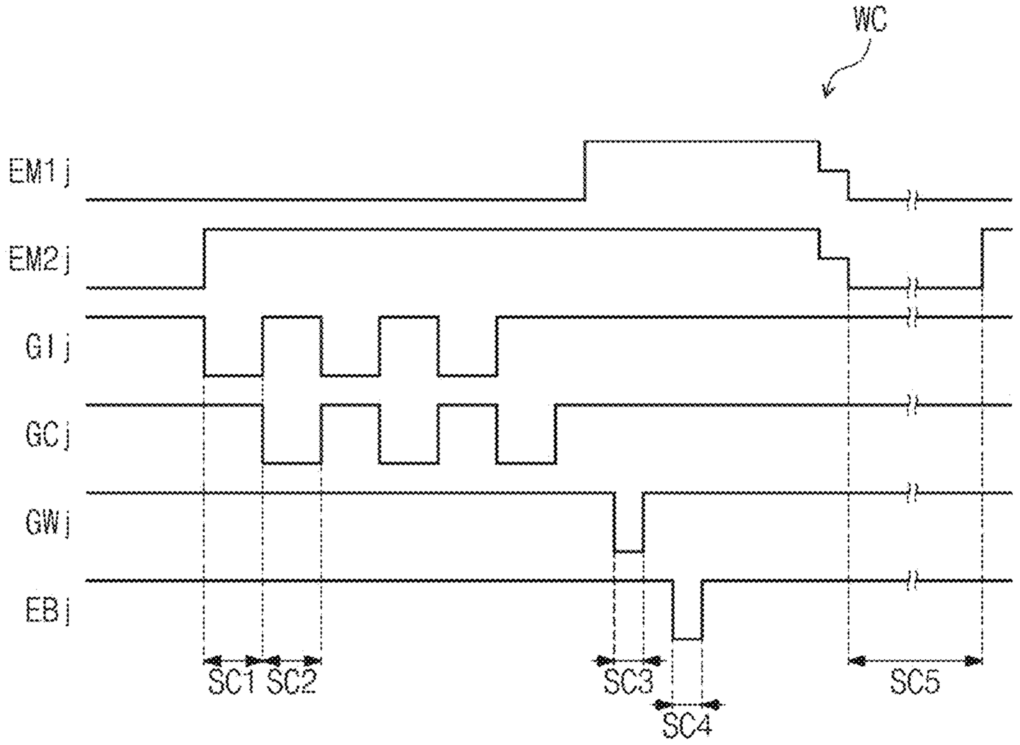
FIG. 4 is a timing diagram illustrating the operation of a pixel in a data write cycle.

FIG. 4 is a timing diagram illustrating an operation of a pixel in the data write cycle WC.

Referring to FIGS. 2 and 4, waveforms of the first and second light-emitting control signals EM1*j* and EM2*j*, the initialization scan signal GIj, the compensation scan signal GCj, the write scan signal GWj, and the bias scan signal EBj are illustrated.

The data write cycle WC may include a first duration SC1, a second duration SC2, a third duration SC3, a fourth duration SC4, and a fifth duration SC5. The first duration SC1 may be also referred to as an initialization duration, the second duration SC2 may be also referred to as a compensation duration, the third duration SC3 may be also referred to as a data write duration, the fourth duration SC4 may be also referred to as an anode initialization duration, and the fifth duration SC5 may be also referred to as a light-emitting duration.

The first duration SC1 is a duration in which the first initialization voltage Vint is provided to the second node N2. For the first duration SC1, the initialization scan signal GIj may have an active level (e.g., a low level). For the first duration SC1, the fourth transistor T4 is turned on in response to the initialization scan signal GIj, and the first initialization voltage Vint is transmitted to the gate electrode of the first transistor T1 through the fourth transistor T4 to initialize the first transistor T1. The first duration SC1 may be an initialization duration for initializing a voltage level of the gate electrode of the first transistor T1.

For the second duration SC2, the compensation scan signal GCj may have an active level (e.g., a low level). For the second duration SC2, the fifth transistor T5 is turned on in response to the compensation scan signal GCj. The first node N1 may be initialized to the reference voltage Vref through the fifth transistor T5 which is turned on. In addition, the third transistor T3 is turned on, in response to the compensation scan signal GCj for the second duration SC2. The first transistor T1 is diode-connected by the third transistor T3 turned on and is forward-biased. Accordingly, the potential across the second node N2 may be set to a difference (ELVDD−Vth) between the first driving voltage ELVDD and a threshold voltage (also referred to as “Vth”) of the first transistor T1. The second duration SC2 may be a compensation duration for compensating for the threshold value of the first transistor T1.

The first duration SC1 and the second duration SC2 in one cycle may be repeated several times to minimize an influence by the data signal Di of the previous frame in the pixel PXij. Although FIG. 4 illustrates that the first duration SC1 and the second duration SC2 are repeated three times, the disclosure is not limited thereto. In an embodiment, the first duration SC1 and the second duration SC2 may be provided one by one, may be alternately repeated twice, or may be alternately repeated at least four times, for example.

For the third duration SC3, the write scan signal GWj may have an active level (e.g., a low level). The second transistor T2 is turned on in response to the write scan signal GWj, and the data signal Di is transmitted to the first node N1 through the second transistor T2, for the third duration SC3. In this case, the potential across the second node N2 may be increased by a voltage level of the data signal Di by the first capacitor Cst. In the case, a compensation voltage, which is obtained by reducing the voltage of the data signal Di supplied from the data line DLi by a threshold voltage of the first transistor T1, is applied to the gate electrode of the first transistor T1. The third duration SC3 may be a programming duration in which the data signal Di is stored in the first capacitor Cst.

For the fourth duration SC4, the bias scan signal EBj may have an active level (e.g., a low level). The seventh transistor T7 may be turned on in response to the bias scan signal EBj, and the fifth driving voltage line VL5 may be connected to the anode of the light-emitting element ED through the seventh transistor T7, for the fourth duration SC4. In addition, the ninth transistor T9 is turned on in response to the bias scan signal EBj, for the fourth duration SC4. The bias voltage Vbias may be provided to the first electrode of the first transistor T1 by the turned-on ninth transistor T9. As the bias voltage Vbias is provided to the first transistor T1, the hysteresis characteristics of the first transistor T1 may be controlled.

The bias scan signal EBj may be activated several times in one cycle. In an embodiment, although the bias scan signal EBj is activated one time by way of example, the bias scan signal EBj may be activated at least two times or three times, for example.

The first and second light-emitting control signals EM1*j* and EM2*j* may have active levels (e.g., low levels) for the fifth duration SC5. In this case, the sixth transistor T6 and the eighth transistor T8 may turned on, and a current path may be formed between the first driving voltage line VL1 and the light-emitting element ED through the eighth transistor T8, the first transistor T1 and the sixth transistor T6. In this case, a driving current may be generated to flow due to the voltage difference between the voltage across the gate electrode of the first transistor T1 and the first driving voltage ELVDD, and the driving current may be supplied to the light-emitting element ED, such that the light-emitting element ED emits light.

Figure 5:
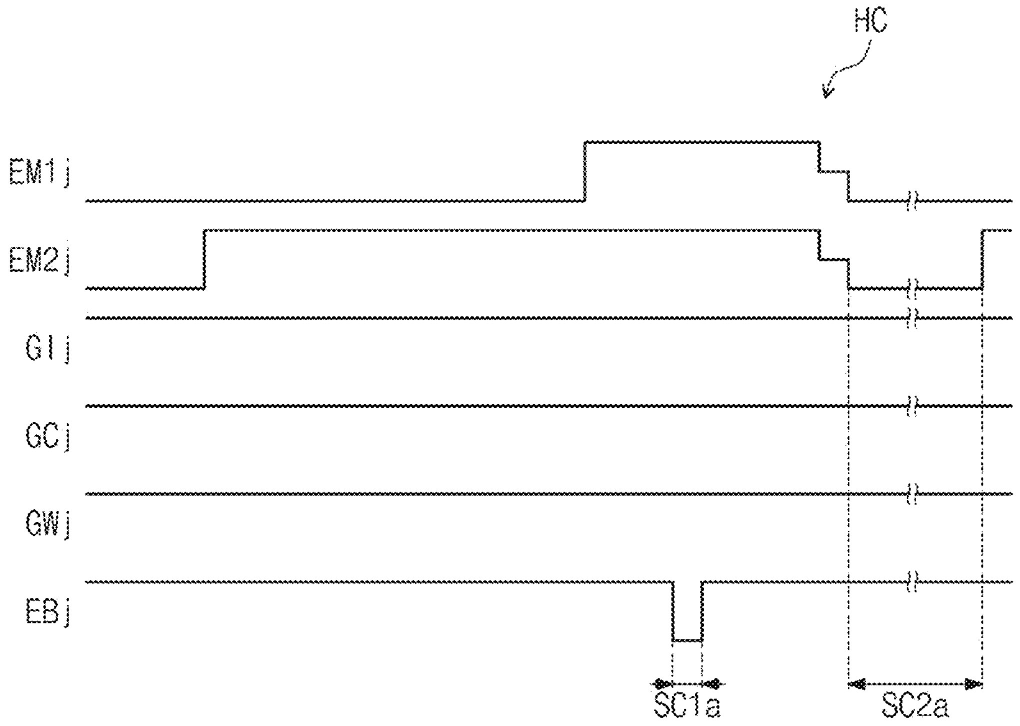
FIG. 5 is a timing diagram illustrating the operation of a pixel in a hold cycle.

FIG. 5 is a timing diagram to explain an operation of a pixel in the hold cycle HC.

Referring to FIGS. 2 and 5, waveforms of first and second light-emitting control signals EM1*j* and EM2*j*, the initialization scan signal GIj, the compensation scan signal GCj, the write scan signal GWj, and the bias scan signal EBj are illustrated. The initialization scan signal GIj, the compensation scan signal GCj, and the write scan signal GWj in the hold cycle HC may have an inactive level (e.g., a high level) in the hold cycle HC.

The hold cycle HC may include a first duration SC1*a* and a second duration SC2*a*. The first duration SC1*a* may be also referred to as an anode initialization duration, and the second duration SC2*a* may be also referred to as a light-emitting duration.

For the first duration SC1*a*, the bias scan signal EBj may have an active level (e.g., a low level). The seventh transistor T7 may be turned on in response to the bias scan signal EBj, and the fifth driving voltage line VL5 may be connected to the anode of the light-emitting element ED through the seventh transistor T7, for the first duration SC1*a*. In addition, the ninth transistor T9 is turned on in response to the bias scan signal EBj, for the first duration SC1*a*. The bias voltage Vbias may be provided to the first electrode of the first transistor T1 by the turned-on ninth transistor T9. As the bias voltage Vbias is provided to the first transistor T1, the hysteresis characteristics of the first transistor T1 may be controlled.

The bias scan signal EBj may be activated several times in one cycle. In an embodiment, although the bias scan signal EBj is activated one time by way of example, the bias scan signal EBj may be activated at least two times or three times, for example.

The first and second light-emitting control signals EM1*j* and EM2*j* may have active levels (e.g., low levels) for the second duration SC2*a*. In this case, the sixth transistor T6 and the eighth transistor T8 may be turned on, and a current path may be formed between the first driving voltage line VL1 and the light-emitting element ED through the eighth transistor T8, the first transistor T1, and the sixth transistor T6 for the second duration SC2*a*. In this case, a driving current may be generated to flow due to the voltage difference between the voltage across the gate electrode of the first transistor T1 and the first driving voltage ELVDD, and the driving current may be supplied to the light-emitting element ED, such that the light-emitting element ED emits light.

Figure 6A:
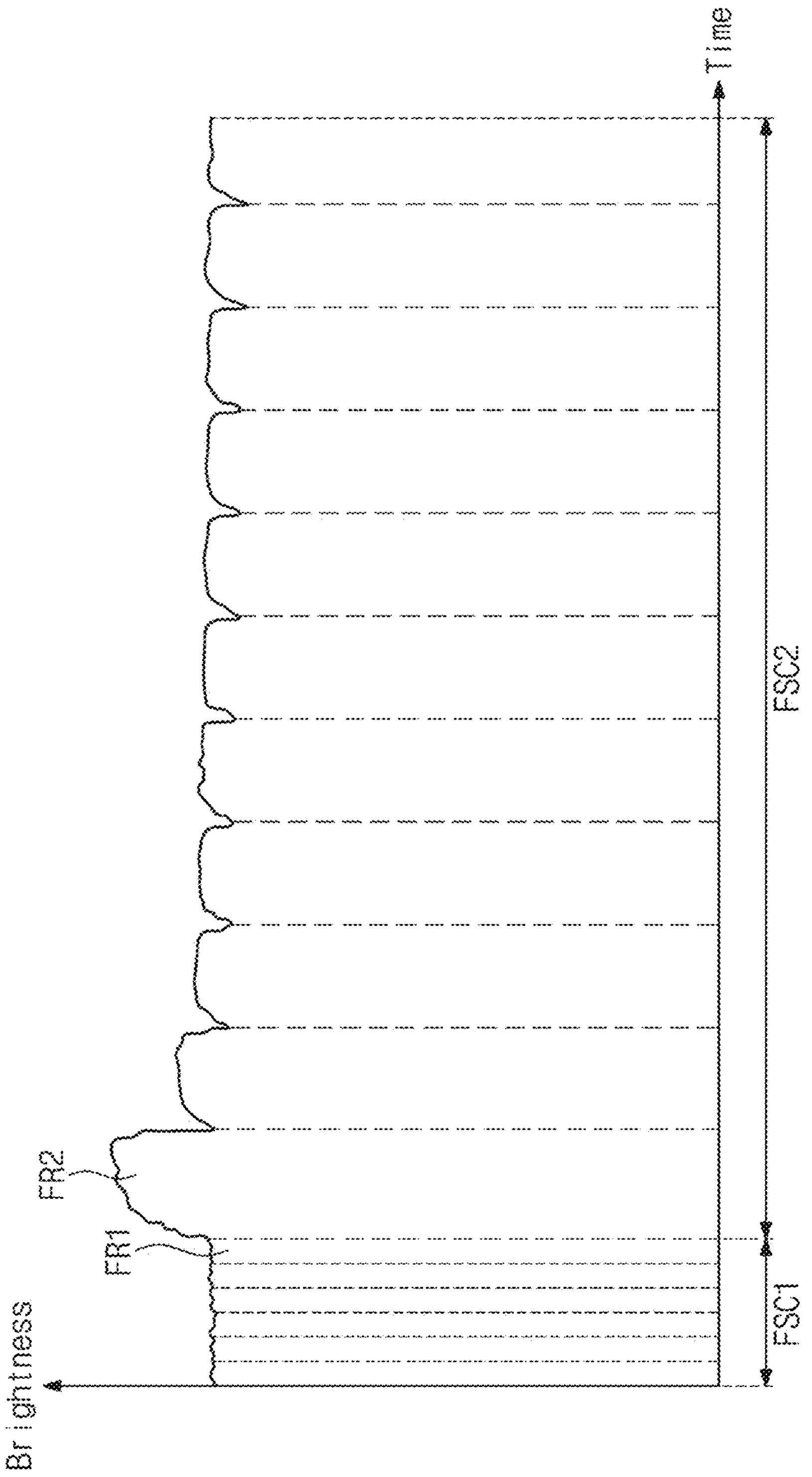
FIGS. 6A and 6B are graphs illustrating the change in brightness resulting from the change in driving frequency.
Figure 6B:
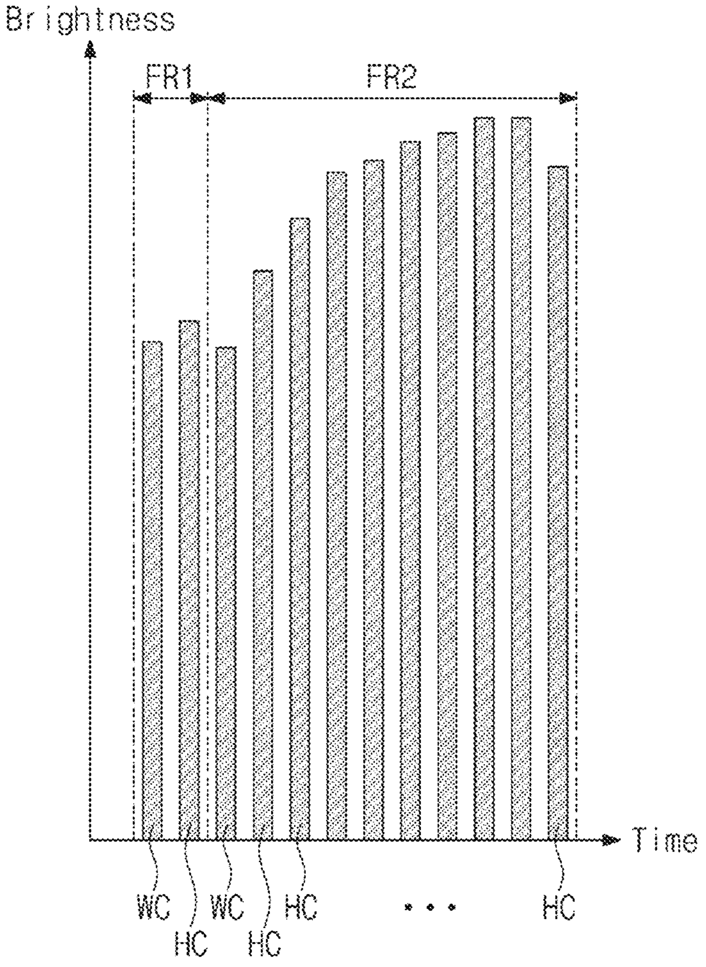

FIGS. 6A and 6B are graphs illustrating the change in brightness resulting from the change in the driving frequency.

FIG. 6A is a graph illustrating the change in brightness for a first duration FSC1 for the operation at the first driving frequency, and the change in brightness for a second duration FSC2 for the operation at the second driving frequency. FIG. 6B is a graph illustrating a change in brightness in one first frame FR1 included in the first duration FSC1 and one second frame FR2 included in the second duration FSC2 in FIG. 6A. The second frame FR2 may be subsequent to the first frame FR1.

The first driving frequency of first frames FR1 included in the first duration FSC1 may be higher than the second driving frequency of the second frames FR2 included in the second duration FSC2. In an embodiment, the first driving frequency may be about 240 Hz and the second driving frequency may be about 48 Hz, for example. In this case, the first frame FR1 may include one data write cycle WC and one hold cycle HC, and the second frame FR2 may include one data write cycle WC and nine hold cycles HC.

The brightness of the second frame FR2 may be increased, right after the first duration FSC1 is switched to the second duration FSC2. In other words, when the driving frequency is changed from a higher frequency to a lower frequency, the flicker phenomenon may be viewed. In an embodiment of the disclosure, the display device DD (refer to FIG. 1) may detect the change in the driving frequency of frames consecutively input, by counting the cycle of the previous frame and the cycle of the current frame, and may perform an operation for compensating for the brightness. Accordingly, the change in brightness resulting from the change in the driving frequency may be reduced or removed, thereby improving the display quality of the display device DD.

Figure 7:
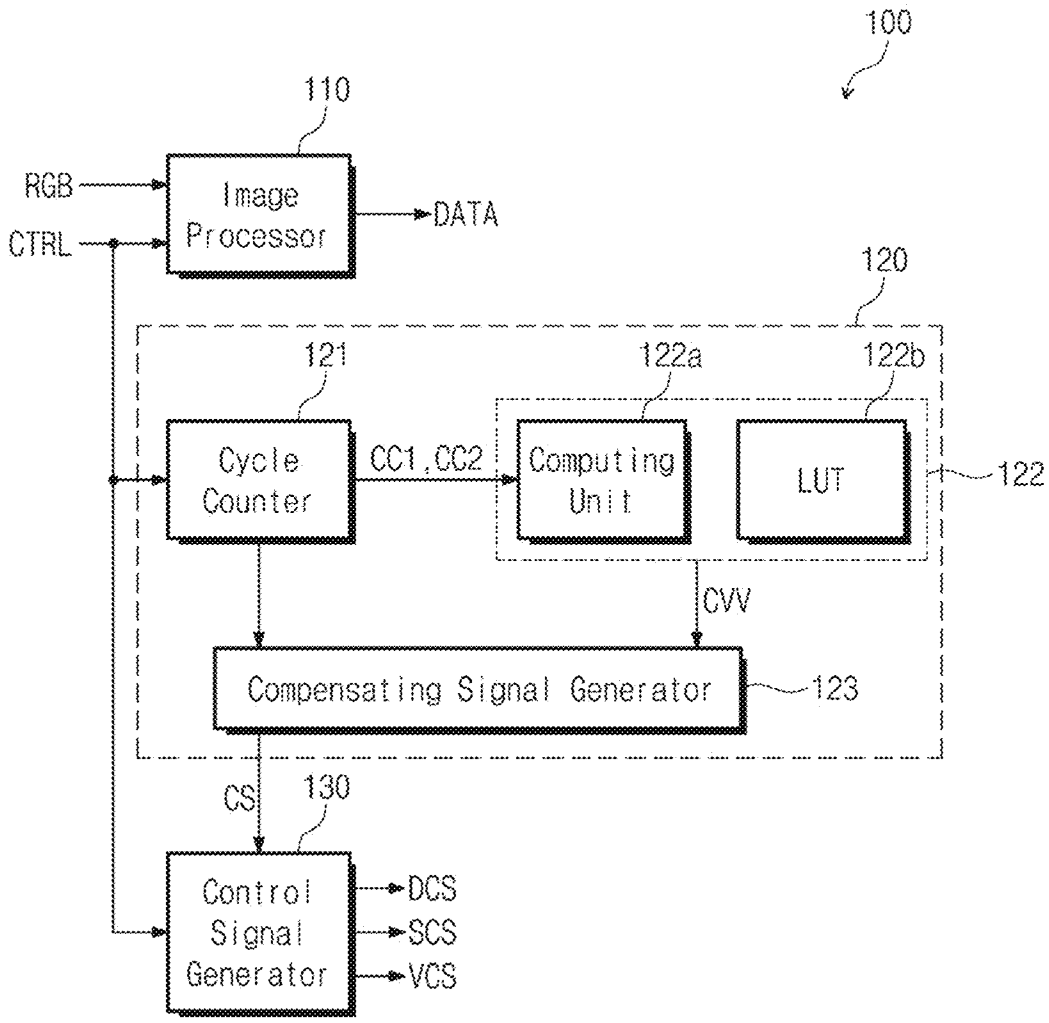
FIG. 7 is a block diagram of an embodiment of a driving controller, according to the disclosure.

FIG. 7 is a block diagram illustrating an embodiment of the driving controller 100, according to the disclosure.

Referring to FIGS. 1, 2, and 7, the driving controller 100 may include an image processor 110, a brightness compensator 120, and a control signal generator 130.

The image processor 110 may receive the image signal RGB and the control signal CTRL, and may generate and output the image data signal DATA, which is obtained by transforming the data format of the image signal RGB to be matched to the interface specification of the data driving circuit 200, The image signal RGB may be input in a random period, in a game environment, e.g., the second mode in which the variable driving frequency is provided. In other words, the driving controller 100 may be cycle-driven to correspond to the random input frequency. In an embodiment, when the input period for the image signal RGB is increased, the number of hold cycles included in one frame may be increased, for example. When the input period for the image signal RGB is decreased, the number of hold cycles included in one frame may be decreased.

The brightness compensator 120 may generate a compensating signal CS, when the first driving frequency of the first frame is determined as being higher than the second driving frequency of the second frame, by comparing a first cycle count value CC1 of the first frame with a second cycle count value CC2 of the second frame subsequent to the first frame. In an embodiment, the brightness compensator 120 may generate the compensating signal CS for controlling the brightness, when the cycle count value of the second frame exceeds an X value, by counting 'X' number of cycles included in the first frame (e.g., the previous frame) and cycles included in the second frame (e.g., the current frame), for example.

The brightness compensator 120 may include a cycle counter 121, a compensation determining unit 122, and a compensating signal generator 123.

The cycle counter 121 may count the number of cycles of each of a plurality of frames. In an embodiment, the cycle counter 121 may store a cycle count value of the previous frame and count cycles of the current frame, for example. The cycle counter 121 may provide the first cycle count value CC1 and the second cycle count value CC2 to the compensation determining unit 122.

In addition, the cycle counter 121 may further include a weight adding unit to add a weight based on the number of times in which a frame, which has the same frequency as that of the previous frame, is consecutively repeated before the previous frame. In an embodiment, the weight may be added to the first cycle count value CC1 or the second cycle count value CC2, for example.

The compensation determining unit 122 may receive the first cycle count value CC1 and the second cycle count value CC2. The compensation determining unit 122 may include a computing unit 122*a* and a look-up table 122*b*.

The computing unit 122*a* may obtain a delta value by subtracting the first cycle count value CC1 from the second cycle count value CC2. However, the operation of the computing unit 122*a* is not particularly limited thereto. The computing unit 122*a* may determine whether to perform compensation, by comparing the first cycle count value CC1 with the second cycle count value CC2.

A compensating value CCV may be stored in the look-up table 122*b*, based on the first cycle count value CC1 and the second cycle count value CC2 which are provided from the cycle counter 121. In an embodiment, when the computing unit 122*a* acquires a delta value, the compensating value CCV corresponding to the delta value may be stored in the look-up table 122*b*, for example. In an embodiment, when the computing unit 122*a* determines whether to perform the compensation, the compensating value CCV corresponding to the second cycle count value CC2 may be stored in the look-up table 122*b*, for example.

The compensating signal generator 123 may determine a control parameter and generate the compensating signal CS, based on the compensating value CCV. The control parameter may be the level of the second initialization voltage Aint, the level of the bias voltage Vbias, the time duration to apply the second initialization voltage Aint, the time duration to apply the bias voltage Vbias, or the off-duty ratios of the first and second light-emitting control signals EM1*j* and EM2*j*.

The control signal generator 130 may output the first control signal SCS, the second control signal DCS, and the third control signal VCS, in response to the control signal CTRL and the compensating signal CS.

In an embodiment of the disclosure, the control signal generator 130 may output the first control signal SCS for adjusting the time duration to apply the second initialization voltage Aint, the time duration to apply the bias voltage Vbias, or the off-duty ratios of the first and second light-emitting control signals EM1*j* and EM2*j*, in response to the compensating signal CS. The driving circuit 300 may adjust a pulse width of the bias scan signal EBj, the first light-emitting control signal EM1*j*, or the second light-emitting control signal EM2*j* in response to the first control signal SCS, such that the bias scan signal EBj, the first light-emitting control signal EM1*j*, or the second light-emitting control signal EM2*j* having the adjusted pulse width is output.

In an embodiment of the disclosure, the control signal generator 130 may output the third control signal VCS for adjusting the level of the second initialization voltage Aint or the level of the bias voltage Vbias in response to the compensating signal CS. Accordingly, the voltage generator 400 may adjust the level of the second initialization voltage Aint or the level of the bias voltage Vbias in response to the third control signal VCS, such that the second initialization voltage Aint or the bias voltage Vbias having the adjusted level is output.

Figure 8:
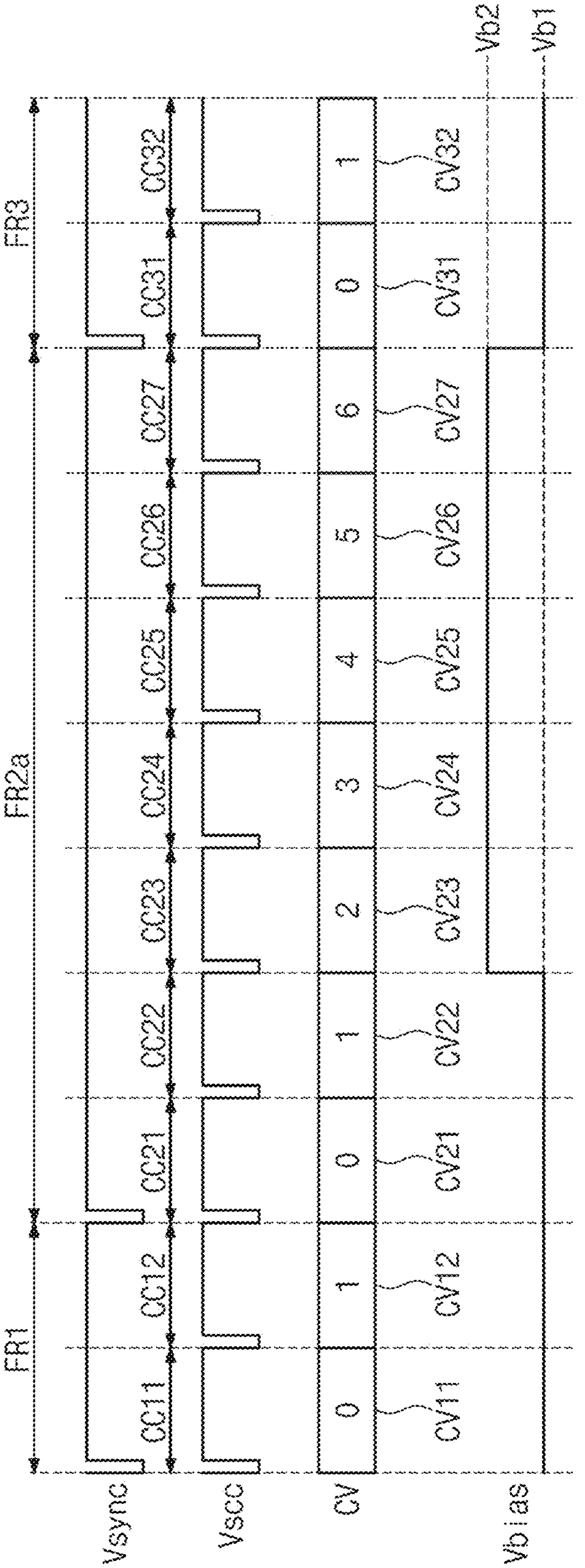
FIG. 8 is a view illustrating an embodiment of an operation for compensating for brightness, according to the disclosure.

FIG. 8 is a view illustrating an embodiment of an operation for compensating for brightness, according to the disclosure.

Referring to FIGS. 1, 7, and 8, the control signal CTRL may include a vertical synchronization signal Vsync and a cycle reference signal Vscc. FIG. 8 illustrates the waveforms of the vertical synchronization signal Vsync, the cycle reference signal Vscc, and the bias voltage Vbias, and the count values CV.

FIG. 8 illustrates a first frame FR1, a second frame FR2*a*, and a third frame FR3. The first frame FR1 may be a previous frame, the second frame FR2*a* may be a current frame, and the third frame FR3 may be a next frame.

The vertical synchronization signal Vsync may be activated to correspond to a time point at which each frame is started and a time point at which data is input. In an embodiment, the vertical synchronization signal Vsync may be activated to correspond to a data write cycle, for example. The vertical synchronization signal Vsync may be activated to correspond to a first cycle CC11 of the first frame FR1, a first cycle CC21 of the second frame FR2*a*, and a first cycle CC31 of the third frame FR3. The first cycles CC11, CC21, and CC31 may correspond to the data write cycle.

The second cycle CC12 of the first frame FR1, the second to seventh cycles CC22, CC23, CC24, CC25, CC26, and CC27 of the second frame FR2*a*, and the second cycle CC32 of the third frame FR3 may correspond to the hold cycle. In particular, the third to seventh cycles CC23, CC24, CC25, CC26, and CC27 of the second frame FR2*a* may be cycles corresponding to a blank section in which the image signal RGB is not input from the outside of the driving controller 100.

The cycle reference signal Vscc may be activated to correspond to each cycle. In an embodiment, a period of the cycle reference signal Vscc may correspond to an impulse driving period, for example. Accordingly, the frequency of the cycle reference signal Vscc may be higher than the maximum driving frequency of the display panel DP. In an embodiment, when the display panel DP is impulse driven in two cycles, the frequency of the cycle reference signal Vscc may be twice the maximum driving frequency of the display panel DP, for example, but the disclosure is not particularly limited thereto. In an embodiment, the display panel DP may be impulse driven in various cycles, such as 4 cycles or 8 cycles. Accordingly, the frequency of the cycle reference signal Vscc may be varied, for example.

The cycle counter 121 may count the number of times in which the cycle reference signal Vscc is activated, between the time point, in which the vertical synchronization signal Vsync is activated, and a next time point in which the vertical synchronization signal Vsync is activated. In other words, the cycle counter 121 may acquire the first cycle count value CC1 by counting the number of times, in which the cycle reference signal Vscc is activated, corresponding to the first period of the vertical synchronization signal Vsync for the first frame FR1, and may acquire the second cycle count value CC2 by counting the number of times, in which the cycle reference signal Vscc is activated, corresponding to the second period of the vertical synchronization signal Vsync for the second frame FR2*a*, The first cycle count value CC1 of the previous frame (e.g., the first frame FR1) may be the final cycle count value CV12, and the second cycle count value CC2 of the current frame (e.g., the second frame FR2*a*) may be the final cycle count value CV27 or count value CV21, CV22, CV23, CV24, CV25, CV26, or CV27.

The compensation determining unit 122 may determine whether the driving frequency of the display panel DP is changed from the higher frequency to the lower frequency by comparing the count value CV12, which is obtained by counting the cycle reference signal Vscc of the first frame FR1, with the count value CV21, CV22, CV23, CV24, CV25, CV26, or CV27, which is obtained by counting the cycle reference signal Vscc of the second frame FR2*a*. In an embodiment, the first cycle count value CC1 of the first frame FR1 may be '1', for example. When the value obtained by counting the cycle reference signal Vscc of the second frame FR2*a* exceeds '1', the compensation determining unit 122 may detect that the driving frequency of the display panel DP is changed from a higher frequency to a lower frequency.

When the count value CV21, CV22, CV23, CV24, CV25, CV26, or CV27 obtained by counting the cycle reference signal Vscc is greater than the first cycle count value CC1, the brightness compensator 120 may provide the compensating signal CS to the control signal generator 130. In an embodiment, the brightness compensator 120 may provide the compensating signal CS to the control signal generator 130 to correspond to the count value CV23, CV24, CV25, CV26, or CV27 having '2' or greater, for example.

The compensation determining unit 122 may determine whether the driving frequency of the display panel DP is changed from the higher frequency to the lower frequency, by comparing the count value CV27, which is obtained by counting the cycle reference signal Vscc of the second frame FR2*a*, with the count value CV31, or CV32 which is obtained by counting the cycle reference signal Vscc of the third frame FR3, in the next frame.

In an embodiment of the disclosure, the compensating signal generator 123 may determine a level of the bias voltage Vbias as a control parameter and provide the compensating signal CS for changing the level of the bias voltage Vbias to the control signal generator 130. The voltage generator 400 may receive the third control signal VCS from the control signal generator 130 and may output the voltage level of the bias voltage Vbias by increasing the voltage level of the bias voltage Vbias a first level Vb1 to a second level Vb2. In an embodiment, the first level Vb1 may be about 6 volts (V) and the second level Vb2 may be about 7 V, for example, but the disclosure is not particularly limited thereto.

According to the disclosure, the driving controller 100 may detect the change in driving frequency between a previous frame and a current frame, and may compensate for brightness based on the change. In an embodiment, the driving controller 100 may control a brightness increment resulting from the change in the driving frequency, by outputting a signal for boosting the bias voltage Vbias, for example. Accordingly, the change in brightness resulting from the change in the driving frequency may be reduced or removed, thereby improving the display quality of the display device DD.

In an embodiment of the disclosure, the bias voltage Vbias may be constantly maintained to be the second level Vb2 in the cycles CC23, CC24, CC25, CC26, and CC27 of the second frame FR2*a*, which show '1' or greater in difference between the cycle count value CV23, CV24, CV25, CV26, or CV27 and the first cycle count value CC1, such that the bias voltage Vbias is stably output.

Figure 9:
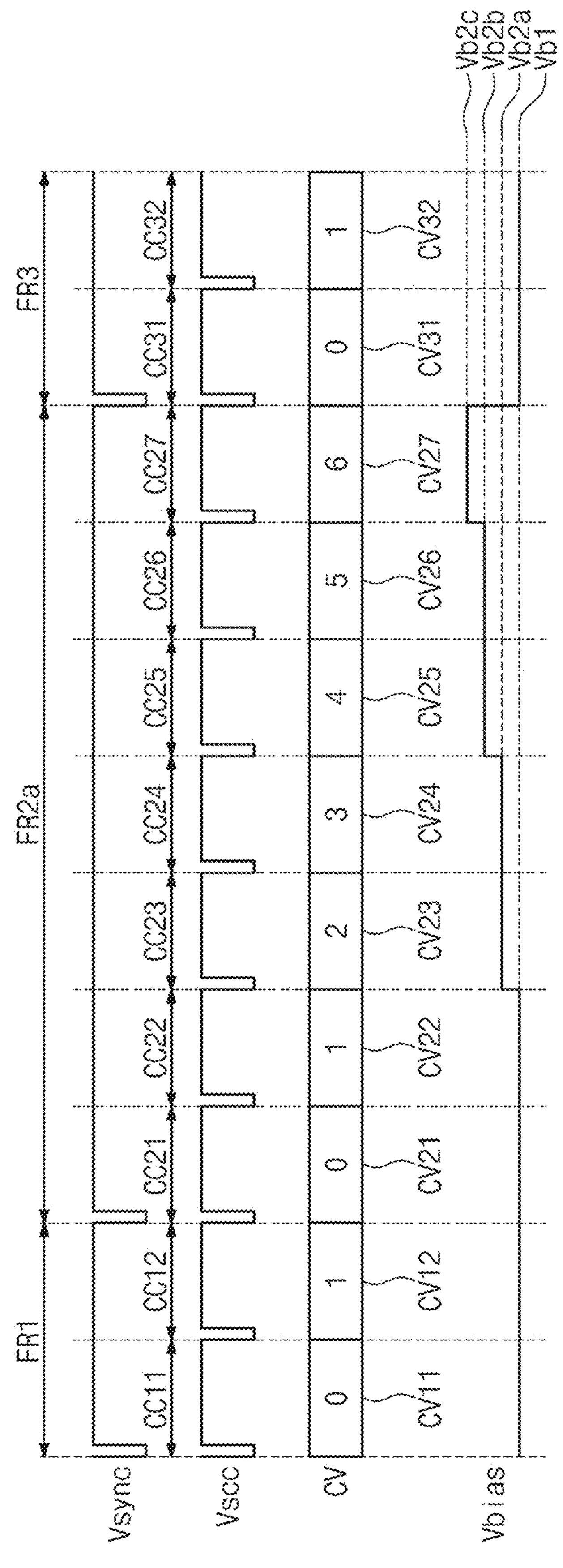
FIG. 9 is a view illustrating an embodiment of an operation for compensating for brightness, according to the disclosure.

FIG. 9 is a view illustrating an embodiment of an operation for compensating for brightness, according to the disclosure. In the following description made with reference to FIG. 9, the same components as the components described with reference to FIG. 8 will be assigned with the same reference numerals, and the details thereof will be omitted to avoid redundancy.

Referring to FIG. 9, when the count value CV21, CV22, CV23, CV24, CV25, CV26, or CV27, which is obtained by counting the cycle reference signal Vscc in the second frame FR2*a*, is greater than the first cycle count value CC1, the brightness compensator 120 may provide the compensating signal CS to the control signal generator 130.

When the first cycle count value CC1 is '1', the level of the bias voltage Vbias may be increased in cycles CC23, CC24, CC25, CC26, or CC27 in which the count value CV21, CV22, CV23, CV24, CV25, CV26, or CV27 obtained by counting the cycle reference signal Vscc exceeds '1'. In an embodiment, the bias voltage Vbias may have a second level Vb2*a* in cycles CC23 and CC24 of the second frame FR2*a*, the bias voltage Vbias may have a third level Vb2*b* in cycles CC25 and CC26 of the second frame FR2*a*, and the bias voltage Vbias may have a fourth level Vb2*c* in the cycle CC27 of the second frame FR2*a*, for example. The first level Vb1 may be about 6 V, the second level Vb2*a* may be about 6.2 V, the third level Vb2*b* may be about 6.4 V, and the fourth level Vb2*c* may be about 6.6 V, but the disclosure is not particularly limited thereto.

In an embodiment of the disclosure, the level of the bias voltage Vbias in the cycles CC23, CC24, CC25, CC26, and CC27 of the second frame FR2*a* may be increased corresponding to that the differences between the second cycle count values CV23, CV24, CV25, CV26, and CV27 in the second frame FR2*a* and the first cycle count value CC1 is increased. Referring to FIG. 6B, after the driving frequency is changed from the higher frequency to the lower frequency, the cycles may have mutually different brightness changes, and the levels of the bias voltage Vbias are changed to correspond to the mutually different brightness changes, thereby optimizing the compensation for the brightness.

Figure 10:
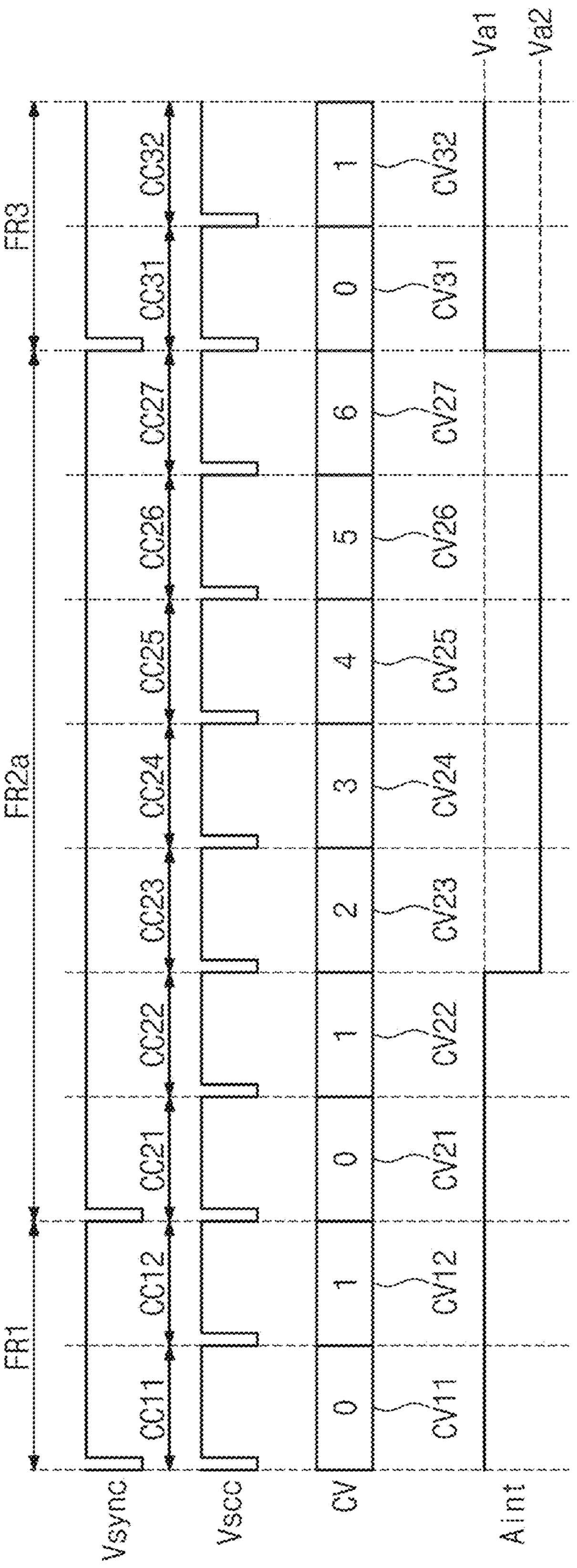
FIG. 10 is a view illustrating an embodiment of an operation for compensating for brightness, according to the disclosure.

FIG. 10 is a view illustrating an embodiment of an operation for compensating for brightness, according to the disclosure. In the following description made with reference to FIG. 10, the same components as the components described with reference to FIG. 8 will be assigned with the same reference numerals, and the details thereof will be omitted to avoid redundancy.

Referring to FIGS. 2, 7, and 10, when the count value CV21, CV22, CV23, CV24, CV25, CV26, or CV27, which is obtained by counting the cycle reference signal Vscc in the second frame FR2*a*, is greater than the first cycle count value CC1, the brightness compensator 120 may provide the compensating signal CS to the control signal generator 130.

In an embodiment of the disclosure, the compensating signal generator 123 may determine a level of the second initialization voltage Aint as a control parameter, and provide the compensating signal CS for changing the level of the second initialization voltage Aint, to the control signal generator 130. The voltage generator 400 may receive the third control signal VCS from the control signal generator 130 and may output the voltage level of the second initialization voltage Aint by decreasing the voltage level from a first level Va1 to a second level Va2. In an embodiment, the first level Va1 may be about −3 V and the second level Va2 may be about −3.5 V, for example, but the disclosure is not particularly limited thereto.

According to the disclosure, the driving controller 100 may detect the change in driving frequency between a previous frame and a current frame, and may compensate for brightness based on the change. In an embodiment, the driving controller 100 may control a brightness increment resulting from the change in the driving frequency, by outputting a signal for dropping the second initialization voltage Aint, for example. Accordingly, the change in brightness resulting from the change in the driving frequency may be reduced or removed, thereby improving the display quality of the display device DD.

In an embodiment of the disclosure, the level of the second initialization voltage Aint is constantly maintained to the second level Va2 in the cycles CC23, CC24, CC25, CC26, and CC27 of the second frame FR2*a*, which shows '1' or greater in difference between the second cycle count values CV23, CV24, CV25, CV26, and CV27 in the second frame FR2*a*, and the first cycle count value CV12, such that the second initialization voltage Aint is stably output.

Figure 11:
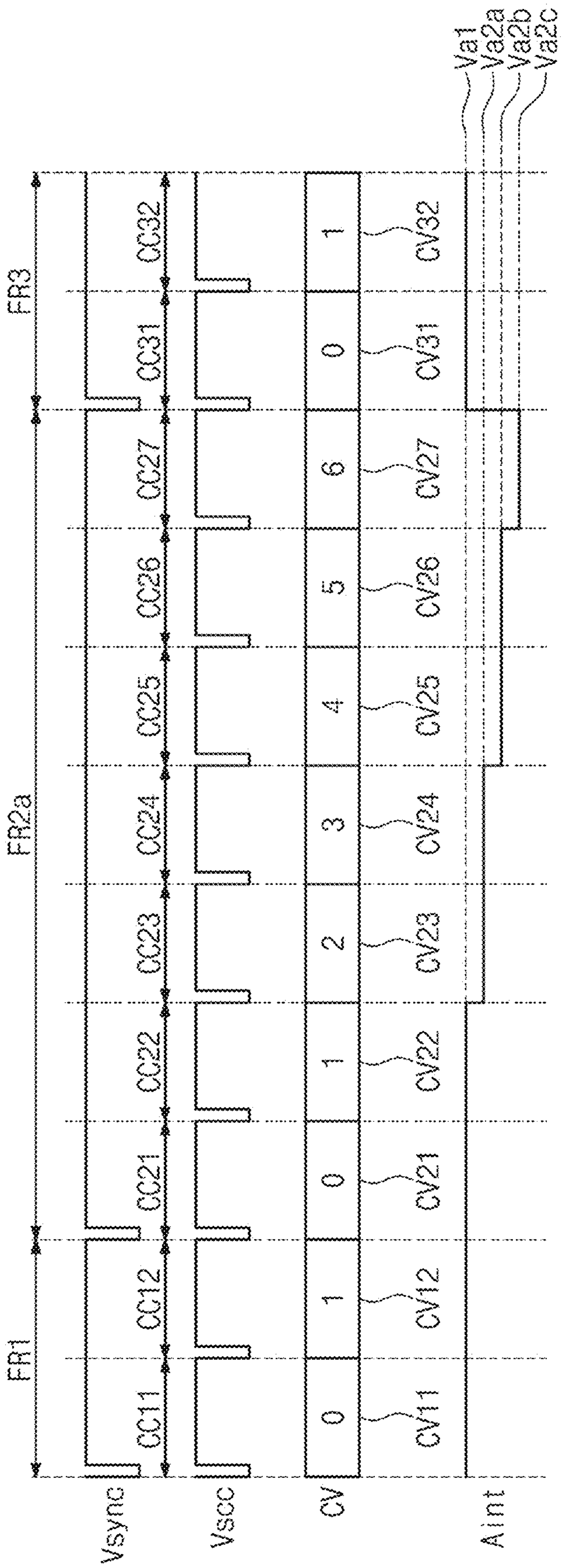
FIG. 11 is a view illustrating an embodiment of an operation for compensating for brightness, according to the disclosure.

FIG. 11 is a view illustrating an embodiment of an operation for compensating for brightness, according to the disclosure. In the following description made with reference to FIG. 11, the same components as the components described with reference to FIG. 8 will be assigned with the same reference numerals, and the details thereof will be omitted to avoid redundancy.

Referring to FIGS. 2, 7, and 11, when the count value CV21, CV22, CV23, CV24, CV25, CV26, or CV27, which is obtained by counting the cycle reference signal Vscc in the second frame FR2*a*, is greater than the first cycle count value CC1, the brightness compensator 120 may provide the compensating signal CS to the control signal generator 130.

When the first cycle count value CC1 is '1', the level of the second initialization voltage Aint may be decreased in cycles CC23, CC24, CC25, CC26, or CC27 in which the count value CV21, CV22, CV23, CV24, CV25, CV26, or CV27 obtained by counting the cycle reference signal Vscc exceeds '1'. In an embodiment, the second initialization voltage Aint may have a second level Va2*a* in cycles CC23 and CC24 of the second frame FR2*a*, the second initialization voltage Aint may have a third level Va2*b* in cycles CC25 and CC26 of the second frame FR2*a*, and the second initialization voltage Aint may have a fourth level Va2*c* in the cycle CC27 of the second frame FR2*a*. The first level Va1 may be about −3 V, the second level Va2*a* may be about −3.2 V, the third level Va2*b* may be about −3.4 V, and the fourth level Va2*c* may be about −3.6 V, for example, but the disclosure is not particularly limited thereto.

In an embodiment of the disclosure, the level of the second initialization voltage Aint may be decreased in the cycles CC23, CC24, CC25, CC26, and CC27 of the second frame FR2*a* to correspond to that the differences between the second cycle count values CV23, CV24, CV25, CV26, CV27 in the second frame FR2*a* and the first cycle count value CV12 is increased. Referring to FIG. 6B, after the driving frequency is changed from the higher frequency to the lower frequency, the cycles may have mutually different brightness changes, and the levels of the second initialization voltage Aint are changed to correspond to the mutually different brightness changes, thereby optimizing the compensation for the brightness.

Figure 12:
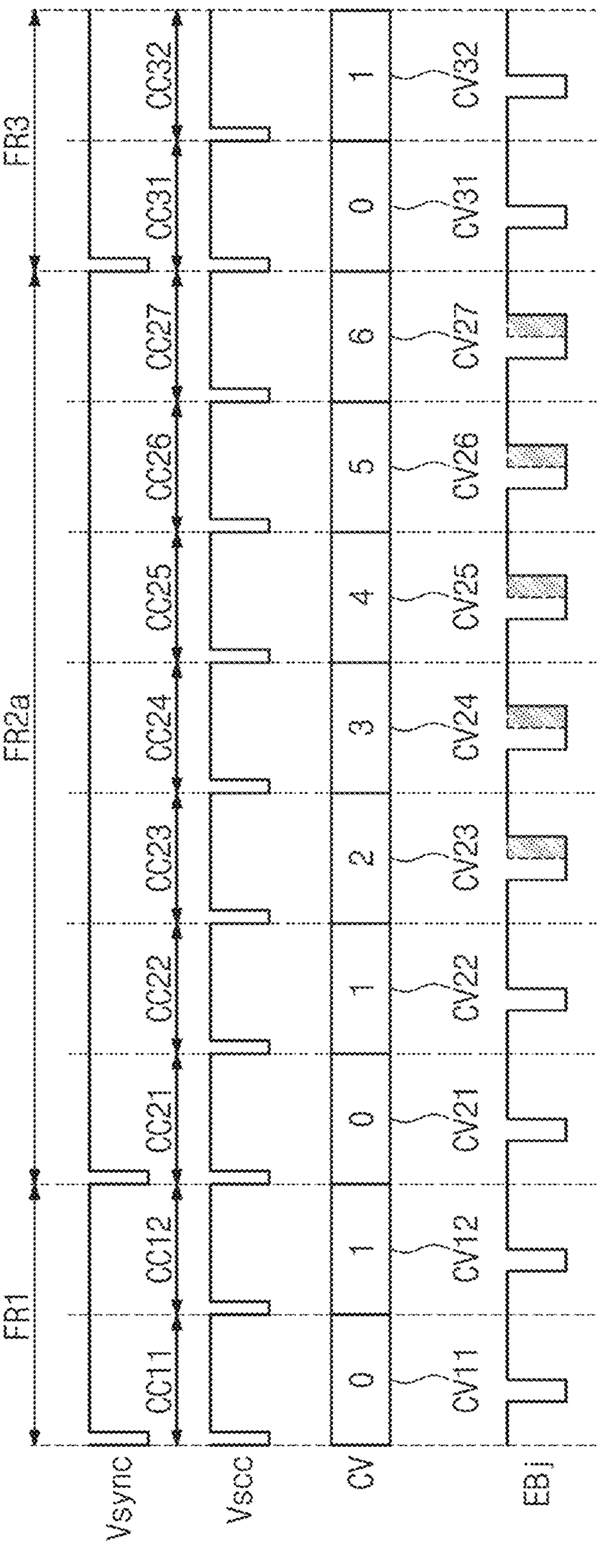
FIG. 12 is a view illustrating an embodiment of an operation for compensating for brightness, according to the disclosure.

FIG. 12 is a view illustrating an embodiment of an operation for compensating for brightness, according to the disclosure. In the following description made with reference to FIG. 12, the same components as the components described with reference to FIG. 8 will be assigned with the same reference numerals, and the details thereof will be omitted to avoid redundancy.

Referring to FIGS. 2, 7, and 12, when the count value CV21, CV22, CV23, CV24, CV25, CV26, or CV27, which is obtained by counting the cycle reference signal Vscc in the second frame FR2*a*, is greater than the first cycle count value CC1, the brightness compensator 120 may provide the compensating signal CS to the control signal generator 130.

In an embodiment of the disclosure, the compensating signal generator 123 may determine the duty ratio of the bias scan signal EBj (hereinafter, also referred to as an initialization transmission signal) as a control parameter, and may provide the compensating signal CS for controlling the on-duty ratio of the initialization transmission signal EBj to the control signal generator 130. The driving circuit 300 may receive the first control signal SCS from the control signal generator 130, and may adjust the on-duty ratio of the initialization transmission signal EBj, such that the initialization transmission signal EBj having the adjusted on-duty ratio is output. As the on-duty ratio of the initialization transmission signal EBj is adjusted, the time duration to apply the bias voltage Vbias and the time duration to apply the second initialization voltage Aint may be adjusted.

In an embodiment, when the difference between the second count value CV21 or CV22 and the first cycle count value CV12 is less than '1', an on-duty ratio of the initialization transmission signal EBj of the first frame FR1 may be the same as an on-duty ratio of the initialization transmission signal EBj of the second frame FR2*a*. In other words, the on-duty ratio of the initialization transmission signal EBj in the cycles CC11 and CC12 of the first frame FR1 may be the same as the on-duty ratio of the initialization transmission signal EBj in the cycles CC21 and CC22 of the second frame FR2*a*, for example. In an alternative embodiment, the width of the low level of the initialization transmission signal EBj in the cycles CC11 and CC12 of the first frame FR1 may be the same as the width of the low level of the initialization transmission signal EBj of the cycles CC21 and CC22 of the second frame FR2*a*.

In an embodiment, when the difference between the second count value CV23, CV24, CV25, CV26, or CV27 and the first cycle count value CV12 is equal to or greater than '1', the on-duty ratio of the initialization transmission signal EBj of the second frame FR2*a* may be higher than the on-duty ratio of the initialization transmission signal EBj of the first frame FR1, for example. In an alternative embodiment, when the difference between the second count value CV23, CV24, CV25, CV26, or CV27 and the first cycle count value CV12 is equal to or greater than '1', the width of the low level of the initialization transmission signal EBj of the second frame FR2*a* may be greater than the width of the low level of the initialization transmission signal EBj of the first frame FR1.

In an embodiment of the disclosure, the driving controller 100 may control the brightness increment resulting from the change in the driving frequency by increasing the time duration to apply the second initialization voltage Aint and the time duration to apply the bias voltage Vbias. Accordingly, the change in brightness resulting from the change in the driving frequency may be reduced or removed, thereby improving the display quality of the display device DD.

In addition, in an embodiment of the disclosure, the initialization transmission signal EBj may have the same on-duty ratio in the cycles CC23, CC24, CC25, CC26, and CC27 of the second frame FR2*a*, which show '1' or greater in the differences between the second cycle count values CV23, CV24, CV25, CV26, CV27 and the first cycle count value CV12. Accordingly, the initialization transmission signal EBj may be stably output to correspond to the cycles CC23, CC24, CC25, CC26, and CC27 of the second frame FR2*a*.

Figure 13:
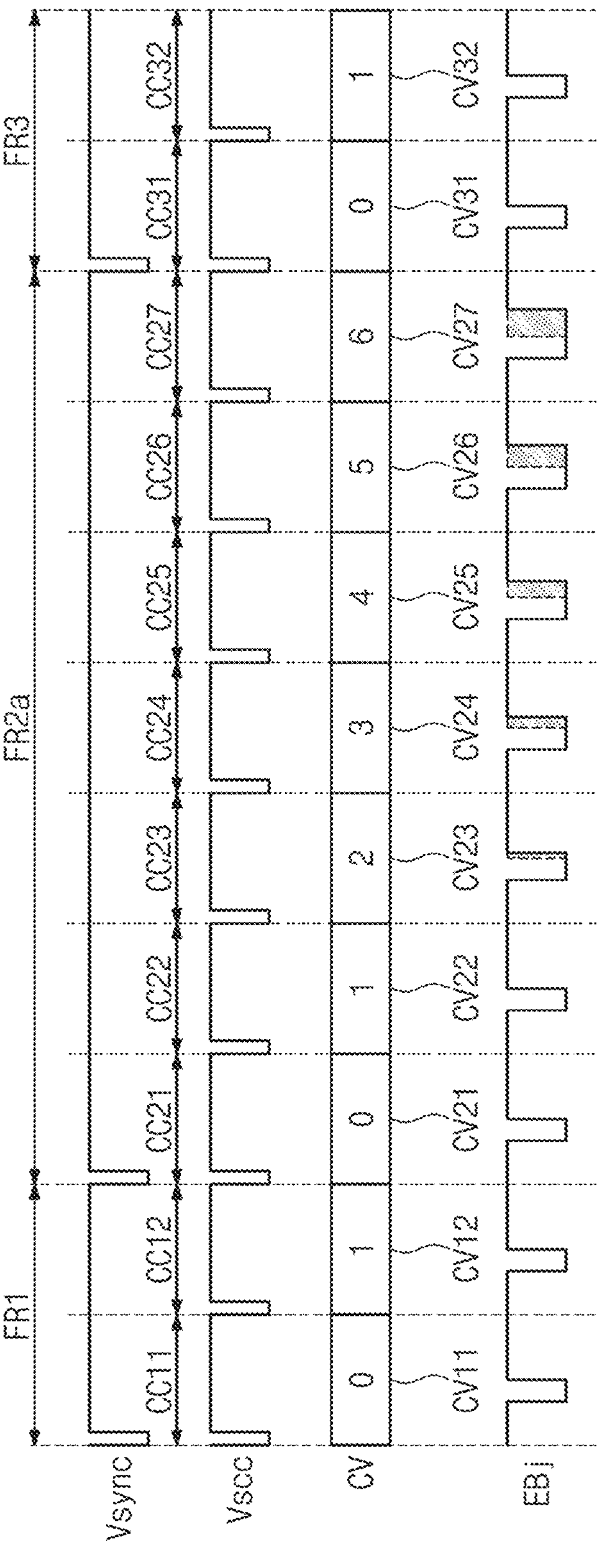
FIG. 13 is a view illustrating an embodiment of an operation for compensating for brightness, according to the disclosure.

FIG. 13 is a view illustrating an embodiment of an operation for compensating for brightness, according to the disclosure. In the following description made with reference to FIG. 13, the same components as the components described with reference to FIG. 8 will be assigned with the same reference numerals, and the details thereof will be omitted to avoid redundancy.

Referring to FIGS. 2, 7, and 13, when the first cycle count value CC1 is '1', the on-duty ratios of the initialization transmission signal EBj may be increased in the cycles CC23, CC24, CC25, CC26, or CC27 in which the count value CV21, CV22, CV23, CV24, CV25, CV26, or CV27 obtained by counting the cycle reference signal Vscc exceeds '1'. In an alternative embodiment, the widths of the low level of the initialization transmission signal EBj may be gradually increased in the cycles CC23, CC24, CC25, CC26, and CC27.

In an embodiment, the on-duty ratios of the initialization transmission signal EBj in the cycles CC25 and CC26 of the second frame FR2*a* may be greater than the on-duties of the initialization transmission signal EBj in the cycles CC23 and CC24 of the second frame FR2*a*, for example. In an alternative embodiment, the on-duty ratios of the initialization transmission signal EBj in the cycle CC27 of the second frame FR2*a* may be greater than the on-duty ratios of the initialization transmission signal EBj in the cycles CC25 and CC26 of the second frame FR2*a*.

In an embodiment of the disclosure, the on-duty ratios of the initialization transmission signal EBj may be adjusted in the cycles CC23, CC24, CC25, CC26, and CC27 of the second frame FR2*a*, to correspond to the increase in the difference between the second cycle count values CV23, CV24, CV25, CV26, and CV27 in the second frame FR2*a* and the first cycle count value CV12. Referring to FIG. 6B, after the driving frequency is changed from the higher frequency to the lower frequency, the cycles may have mutually different brightness changes. As the on-duty ratios of the initialization transmission signal EBj are changed to correspond to the mutually different brightness changes, thereby optimizing the compensation for the brightness.

Figure 14:
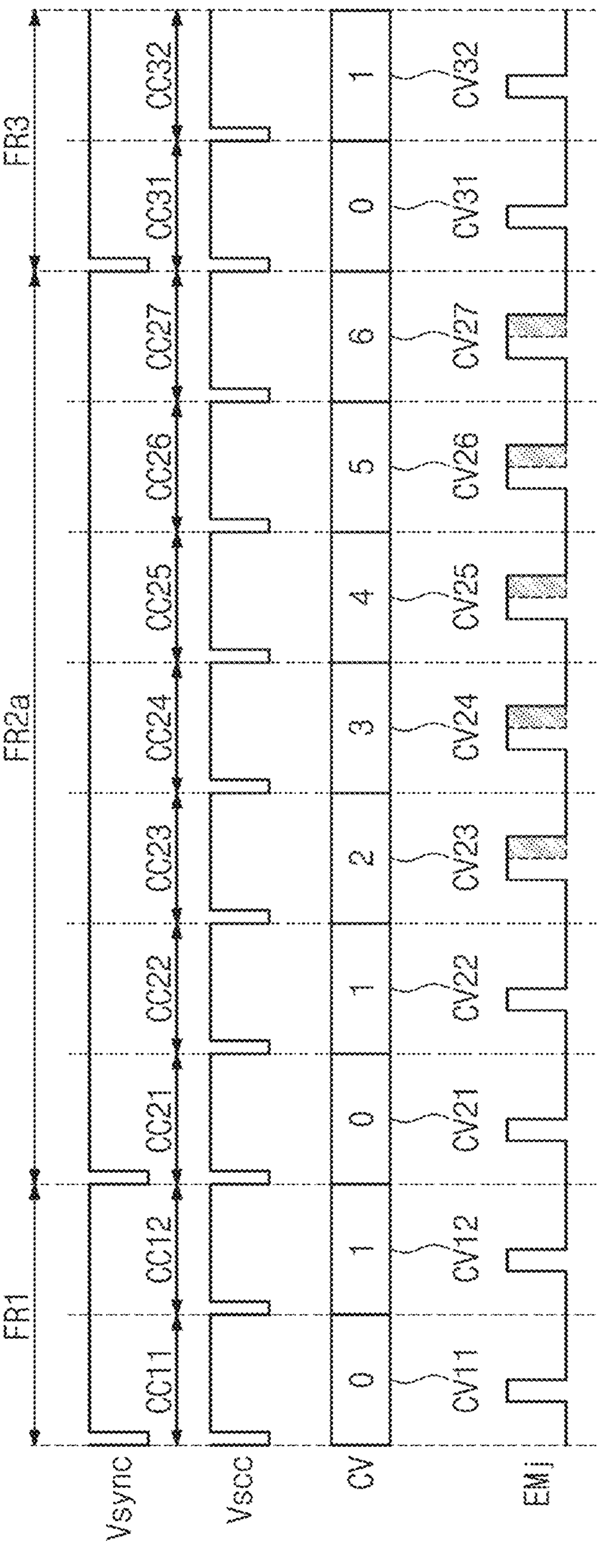
FIG. 14 is a view illustrating an embodiment of an operation for compensating for brightness, according to the disclosure.

FIG. 14 is a view illustrating an embodiment of an operation for compensating for brightness, according to the disclosure. In the following description made with reference to FIG. 14, the same components as the components described with reference to FIG. 8 will be assigned with the same reference numerals, and the details thereof will be omitted to avoid redundancy.

Referring to FIGS. 2, 7, and 14, when the count value CV21, CV22, CV23, CV24, CV25, CV26, or CV27 which is obtained by counting the cycle reference signal Vscc in the second frame FR2*a* is greater than the first cycle count value CC1, the brightness compensator 120 may provide the compensating signal CS to the control signal generator 130. In an embodiment, the compensating signal generator 123 may determine the off-duty ratio of the light-emitting control signal EMj as the control parameter, and may provide the compensating signal CS for controlling the off-duty ratio of the light-emitting control signal EMj to the control signal generator 130. The light-emitting control signal EMj may be the first light-emitting control signal EMU or the second light-emitting control signal EM2*j*, for example.

The driving circuit 300 may receive the first control signal SCS from the control signal generator 130, and may adjust the off-duty ratio of the light-emitting control signal EMj, such that the light-emitting control signal EMj having the adjusted off-duty ratio is output. In an embodiment, when the difference between the second count value CV21 or CV22 and the first cycle count value CV12 is less than '1', an off-duty ratio of the light-emitting control signal EMj of the first frame FR1 may be the same as an off-duty ratio of the light-emitting control signal EMj of the cycles CC21 and CC22 of the second frame FR2, for example. In an alternative embodiment, the width of the high level of the light-emitting control signal EMj of the cycles CC11 and CC12 of the first frame FR1 may be equal to the width of the high level of the light-emitting control signal EMj of the cycles CC21 and CC22 of the second frame FR2*a*.

When the difference between the second count value CV23, CV24, CV25, CV26, or CV27 and the first cycle count value CV12 is equal to or greater than '1', an off-duty ratio of the light-emitting control signal EMj in the cycle CC23, CC24, CC25, CC26, or CC27 of the second frame FR2*a* may be higher than an off-duty ratio of the light-emitting control signal EMj of the first frame FR1. In an alternative embodiment, when the difference between the second count value CV23, CV24, CV25, CV26, or CV27 and the first cycle count value CV12 is equal to or greater than '1', the width of the high level of the light-emitting control signal EMj of the second frame FR2*a* may be greater than the high level of the light-emitting control signal EMj of the first frame FR1. In other words, as the time duration to emit light is reduced in the cycles CC23, CC24, CC25, CC26, or CC27, the brightness increment may be controlled.

According to the disclosure, the driving controller 100 may detect the change in driving frequency between a previous frame and a current frame, and may compensate for brightness based on the change. In an embodiment, the driving controller 100 may control a brightness increment resulting from the change in the driving frequency, by outputting a signal for controlling the off-duty ratio of the light-emitting control signal EMj, for example. Accordingly, the change in brightness resulting from the change in the driving frequency may be reduced or removed, thereby improving the display quality of the display device DD.

In an embodiment of the disclosure, the off-duty ratios of the light-emitting control signal EMj may be constantly maintained in the cycles CC23, CC24, CC25, CC26, or CC27 of the second frame FR2*a*, when the difference between the second cycle count values CV23, CV24, CV25, CV26, and CV27 in the second frame FR2*a* and the first cycle count value CV12 is equal to or greater than '1', thereby stably outputting the light-emitting control signal EMj.

Figure 15:
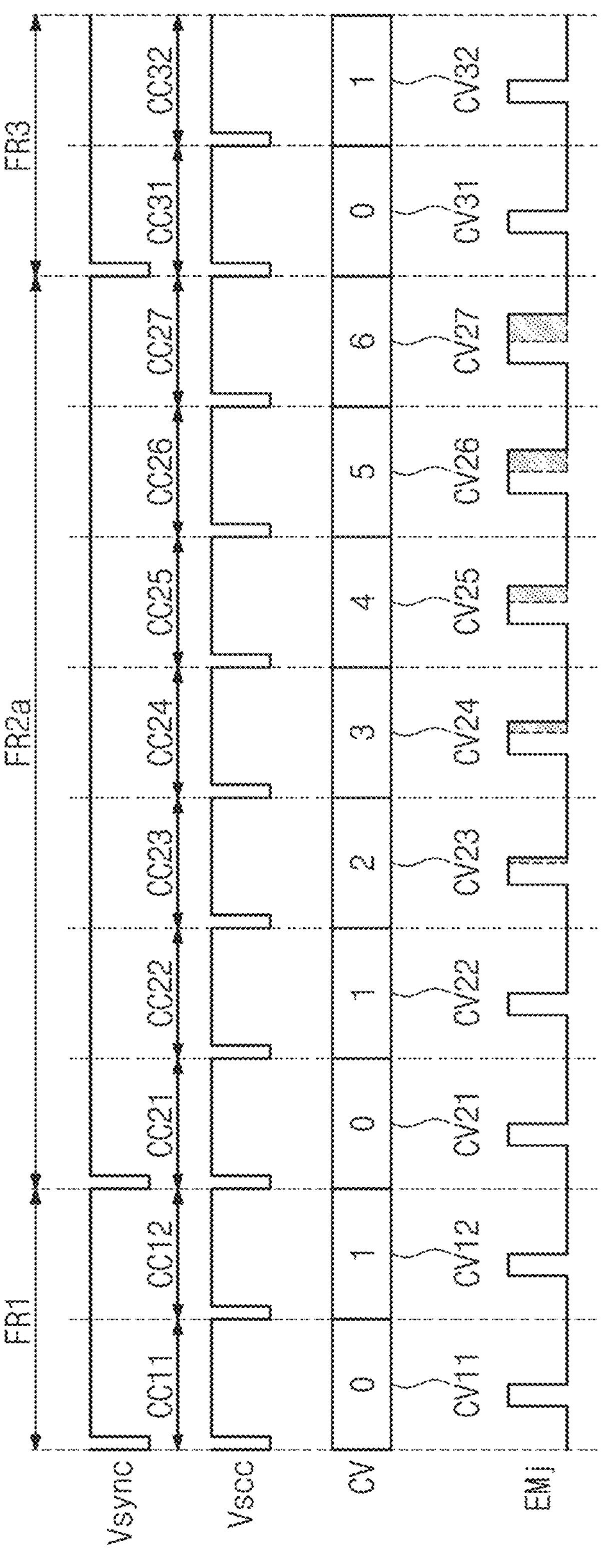
FIG. 15 is a view illustrating an embodiment of an operation for compensating for brightness, according to the disclosure.

FIG. 15 is a view illustrating an embodiment of an operation for compensating for brightness, according to the disclosure. In the following description made with reference to FIG. 15, the same components as the components described with reference to FIG. 8 will be assigned with the same reference numerals, and the details thereof will be omitted to avoid redundancy.

Referring to FIGS. 2, 7, and 15, when the first cycle count value CC1 is '1', the off-duty ratios of the light-emitting control signal EMj may be increased in the cycles CC23, CC24, CC25, CC26, or CC27 in which the count value CV21, CV22, CV23, CV24, CV25, CV26, or CV27 obtained by counting the cycle reference signal Vscc exceeds '1'.

In an embodiment, the off-duty ratios of the light-emitting control signal EMj in the cycles CC25 and CC26 of the second frame FR2*a* may be higher than the off-duty ratios of the light-emitting control signal EMj in the cycles CC23 and CC24 of the second frame FR2*a*, for example. In addition, the off-duty ratios of the light-emitting control signal EMj in the cycle CC27 of the second frame FR2*a* may be higher than the off-duty ratios of the light-emitting control signal EMj in the cycles CC25 and CC26 of the second frame FR2*a*. In an alternative embodiment, the widths of the high level of the light-emitting control signal EMj may be gradually increased in the cycles CC23, CC24, CC25, CC26, and CC27, for example.

In an embodiment of the disclosure, the off-duty ratios of the light-emitting control signal EMj in the cycles CC23, CC24, CC25, CC26, and CC27 of the second frame FR2*a* may be adjusted to correspond to that the differences between the second cycle count values CV23, CV24, CV25, CV26, CV27 in the second frame FR2*a* and the first cycle count value CV12 is increased. Referring to FIG. 6B, after the driving frequency is changed from the higher frequency to the lower frequency, the cycles may have mutually different brightness changes. As the on-duty ratios of the initialization transmission signal EBj are changed to correspond to the mutually different brightness changes, thereby optimizing the compensation for the brightness.

Figure 16:
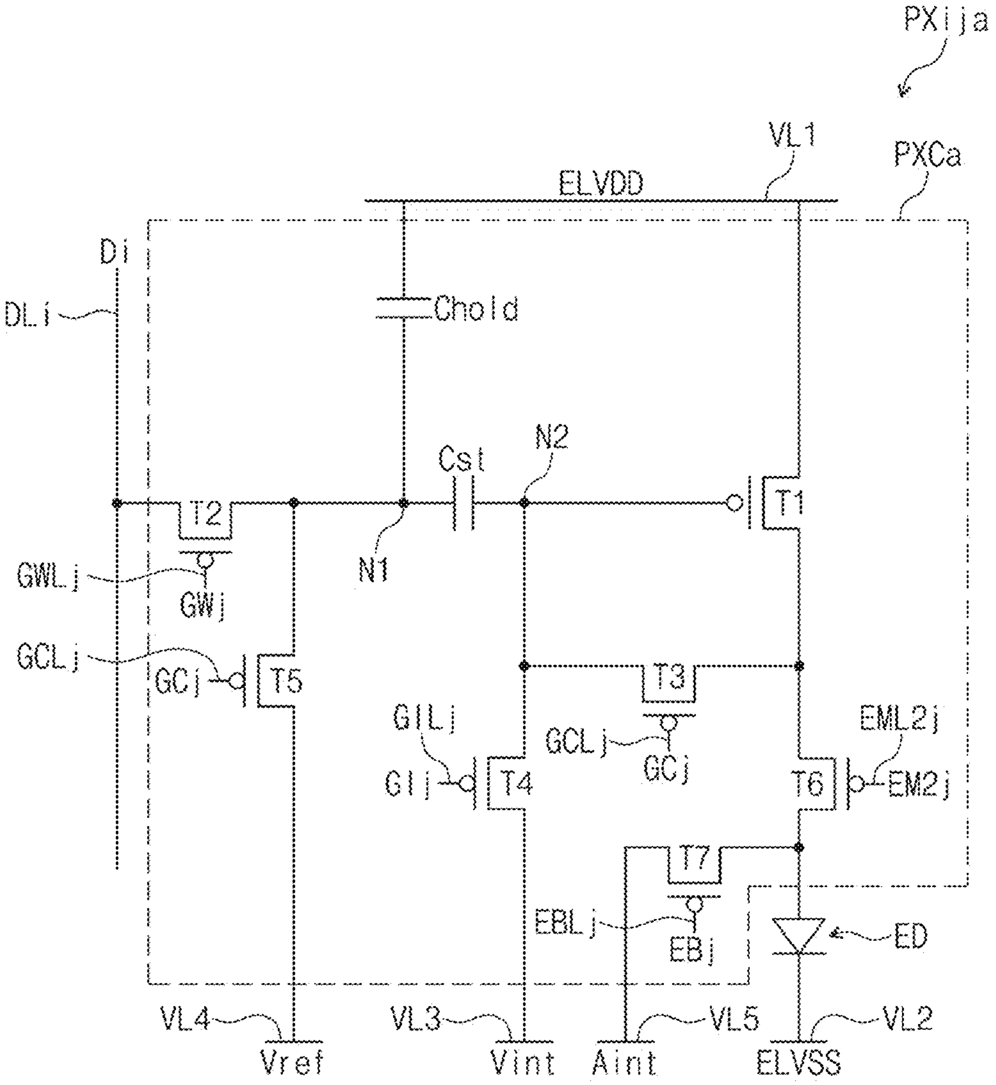
FIG. 16 is a circuit diagram of an embodiment of a pixel, according to the disclosure.

FIG. 16 is a circuit diagram of an embodiment of a pixel PXija according to the disclosure. In the following description made with reference to FIG. 16, the same components as the components described with reference to FIG. 2 will be assigned with the same reference numerals, and the details thereof will be omitted to avoid redundancy.

Referring to FIG. 16, in an embodiment of the disclosure, the pixel PXija includes a pixel circuit PXCa and at least one light-emitting element ED. The pixel circuit PXCa may include first to seventh transistors T1, T2, T3, T4, T5, T6, and T7, a first capacitor Cst, and a second capacitor Chold.

When the display panel DP (refer to FIG. 1) includes the pixel PXija illustrated in FIG. 16, a control parameter for compensating for the brightness may include a level of the second initialization voltage Aint, a time duration to apply the second initialization voltage Aint, or an off-duty ratio of the second light-emitting control signal EM2J. In other words, the brightness increment from the change in the driving frequency may be reduced or removed through an operation for compensating for the brightness as illustrated in FIG. 10, 11, 12, 13, 14, or 15.

Figure 17:
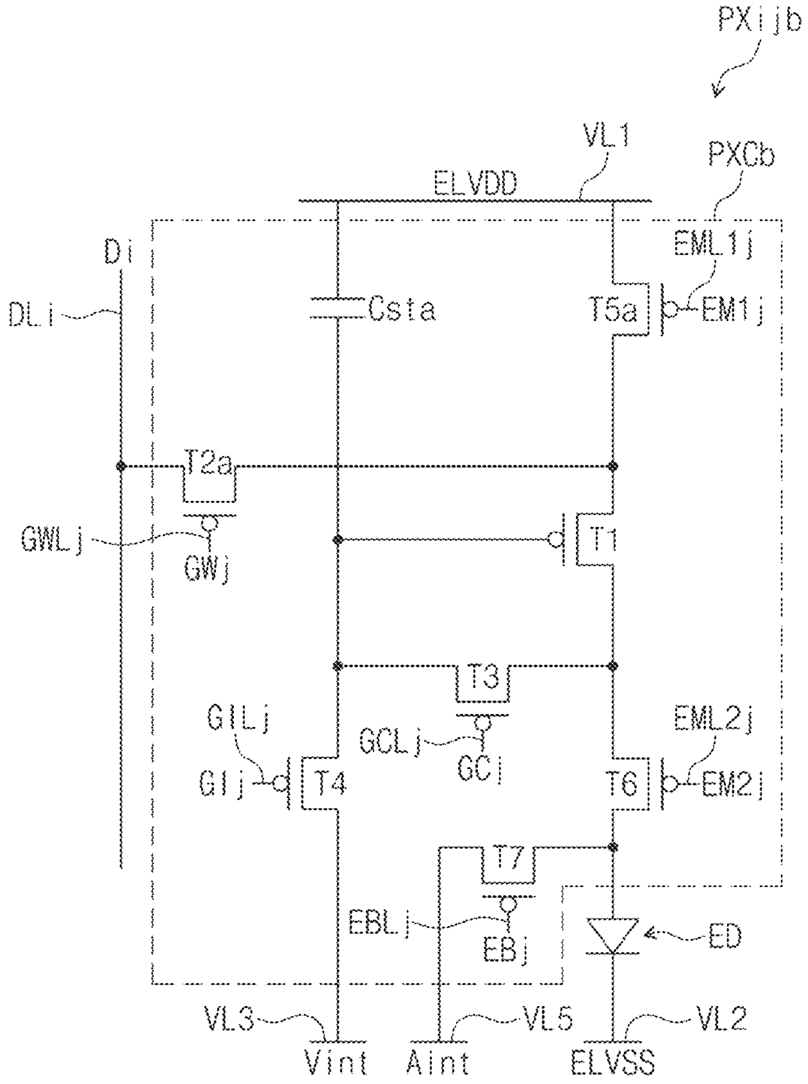
FIG. 17 is a circuit diagram of an embodiment of a pixel, according to the disclosure.

FIG. 17 is a circuit diagram of an embodiment of a pixel PXijb according to the disclosure. In the following description made with reference to FIG. 17, the same components as the components described with reference to FIG. 2 will be assigned with the same reference numerals, and the details thereof will be omitted to avoid redundancy.

Referring to FIG. 17, in an embodiment of the disclosure, the pixel PXijb includes a pixel circuit PXCb and at least one light-emitting element ED. The pixel circuit PXCb may include first to seventh transistors T1, T2*a*, T3, T4, T5*a*, T6, and T7, and a capacitor Csta.

The capacitor Csta may be connected between the first driving voltage line VL1 and the gate electrode of the first transistor T1.

The second transistor T2*a* includes a first electrode connected to the data line DLi, a second electrode connected to the first electrode of the first transistor T1, and a gate electrode connected to the j-th write scan line GWLj. The second transistor T2*a* may be turned on in response to the write scan signal GWj received through the j-th write scan line GWLj and may transmit the data signal Di received through the data line DLi to the first electrode of the first transistor T1. The second transistor T2*a* may be also referred to as a switching transistor.

The fifth transistor T5*a* includes a first electrode connected to the first driving voltage line VL1, a second electrode connected to the first electrode of the first transistor T1, and a gate electrode connected to the j-th first light-emitting control line EML1*j*. The fifth transistor T5*a* may be turned on in response to the first light-emitting control signal EM1*j* received through the j-th first light-emitting control line EML1*j*. As the fifth transistor T5*a* and the sixth transistor T6 may turned on, a current path may be formed between the first driving voltage line VL1 and the light-emitting element ED through the fifth transistor T5*a*, the first transistor T1, and the sixth transistor T6.

When the display panel DP (refer to FIG. 1) includes the pixel PXijb illustrated in FIG. 17, a control parameter for compensating for the brightness may include a level of the second initialization voltage Aint, a time duration to apply the second initialization voltage Aint, an off-duty ratio of the first light-emitting control signal EMU, or an off-duty ratio of the second light-emitting control signal EM2*j*. In other words, the brightness increment from the change in the driving frequency may be reduced or removed through an operation for compensating for the brightness as illustrated in FIG. 10, 11, 12, 13, 14, or 15.

Figure 18:
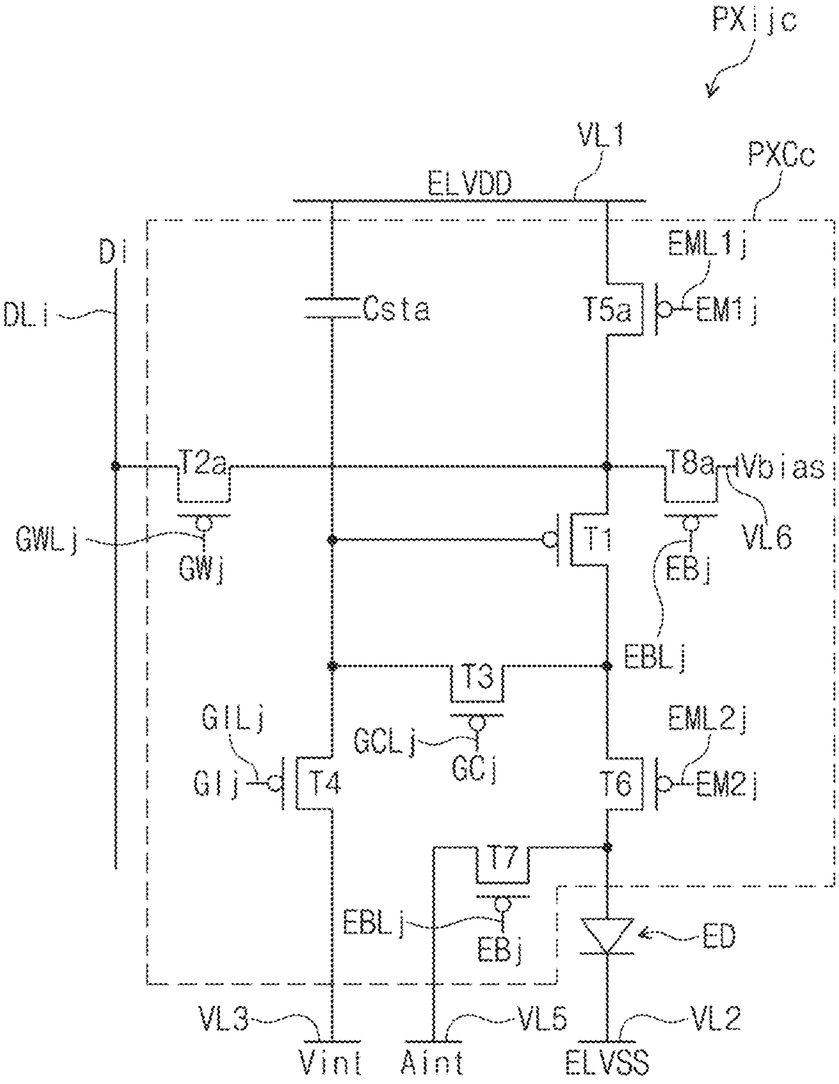
FIG. 18 is a circuit diagram of an embodiment of a pixel, according to the disclosure.

FIG. 18 is a circuit diagram of an embodiment of a pixel PXijc according to the disclosure. In the following description made with reference to FIG. 18, the same components as the components described with reference to FIG. 2 will be assigned with the same reference numerals, and the details thereof will be omitted to avoid redundancy.

Referring to FIG. 18, in an embodiment of the disclosure, the pixel PXijc includes a pixel circuit PXCc and at least one light-emitting element ED. The pixel circuit PXCc may include first to eighth transistors T1, T2*a*, T3, T4, T5*a*, T6, T7, or T8*a*, and the capacitor Csta.

The eighth transistor T8*a* includes a first electrode connected to a sixth driving voltage line VL6, a second electrode connected to the first electrode of the first transistor T1, and a gate electrode connected to the j-th bias scan line EBLj. The eighth transistor T8*a* may be turned on in response to the bias scan signal EBj received through the j-th bias scan line EBLj to transmit the bias voltage Vbias to the first electrode of the first transistor T1.

When the display panel DP (refer to FIG. 1) includes the pixel PXijc illustrated in FIG. 18, a control parameter for compensating for the brightness may include a level of the second initialization voltage Aint, a time duration to apply the second initialization voltage Aint, a level of the bias voltage Vbias, the time duration to apply the bias voltage Vbias, an off-duty ratio of the first light-emitting control signal EMU, or an off-duty ratio of the second light-emitting control signal EM2*j*. In other words, the brightness increment from the change in the driving frequency may be reduced or removed through an operation for compensating for brightness as illustrated in FIG. 8, 9, 10, 11, 12, 13, 14, or 15.

As described above, the driving controller may detect the change in a driving frequency of a previous frame and the change in a driving frequency of a current frame by counting cycles and may compensate for the brightness based on the detected change. Accordingly, the change in brightness may be reduced or removed based on the change in the driving frequency, thereby improving the display quality of the display device.

Although an embodiment of the disclosure has been described for illustrative purposes, those skilled in the art will appreciate that various modifications, and substitutions are possible, without departing from the scope and spirit of the invention as disclosed in the accompanying claims. Accordingly, the technical scope of the disclosure is not limited to the detailed description of this specification, but should be defined by the claims.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:

a display panel including a pixel; and a driving controller which drives the display panel, wherein the driving controller generates a compensating signal, when a first driving frequency of a first frame is determined as being higher than a second driving frequency of a second frame by comparing a first cycle count value of the first frame with a second cycle count value of the second frame immediately subsequent to the first frame.

2. The display device of claim 1, wherein the driving controller:

acquires the first cycle count value by counting a cycle reference signal corresponding to a first period of a vertical synchronization signal for the first frame; and acquires the second cycle count value by counting a cycle reference signal corresponding to a second period of the vertical synchronization signal for the second frame.

3. The display device of claim 1, wherein the pixel includes a pixel circuit and a light-emitting element connected to the pixel circuit, wherein the pixel receives a plurality of scan signals, a light-emitting control signal, a plurality of driving voltages, and a data signal, and wherein the plurality of driving voltages includes a first driving voltage, a second driving voltage, a first initialization voltage, and a second initialization voltage.

4. The display device of claim 3, wherein an off-duty ratio of the light-emitting control signal is controlled through the compensating signal.

5. The display device of claim 4, wherein an off-duty ratio of the light-emitting control signal for the first frame is equal to an off-duty ratio of the light-emitting control signal for the second frame, when a difference between the second cycle count value and the first cycle count value is less than '1', and wherein the off-duty ratio of the light-emitting control signal for the second frame is higher than the off-duty ratio of the light-emitting control signal for the first frame, when the difference between the second cycle count value and the first cycle count value is equal to or greater than '1'.

6. The display device of claim 5, wherein off-duty ratios of the light-emitting control signal in cycles of the second frame are equal to each other, when the difference between the second cycle count value and the first cycle count value is equal to or greater than '1'.

7. The display device of claim 5, wherein off-duty ratios of the light-emitting control signal in cycles of the second frame are increased, when the difference between the second cycle count value and the first cycle count value is equal to or greater than '1'.

8. The display device of claim 3, wherein the pixel circuit includes an initialization transistor connected between a voltage line which provides the second initialization voltage and the light-emitting element, and wherein the plurality of scan signals includes an initialization transmission signal, and wherein the initialization transistor has an operation controlled in response to the initialization transmission signal.

9. The display device of claim 8, wherein an on-duty ratio of the initialization transmission signal is controlled through the compensating signal.

10. The display device of claim 9, wherein an on-duty ratio of the initialization transmission signal for the first frame is equal to an on-duty ratio of the initialization transmission signal for the second frame, when a difference between the second cycle count value and the first cycle count value is less than '1', and wherein the on-duty ratio of the initialization transmission signal for the second frame is higher than the on-duty ratio of the initialization transmission signal for the first frame, when the difference between the second cycle count value and the first cycle count value is equal to or greater than '1'.

11. The display device of claim 10, wherein on-duty ratios of the initialization transmission signal in cycles of the second frame are equal to each other, when the difference between the second cycle count value and the first cycle count value is equal to or greater than '1'.

12. The display device of claim 10, wherein on-duty ratios of the initialization transmission signal in cycles of the second frame are increased, when the difference between the second cycle count value and the first cycle count value is equal to or greater than '1'.

13. The display device of claim 8, wherein a level of the second initialization voltage is controlled through the compensating signal.

14. The display device of claim 13, wherein a level of the second initialization voltage in the first frame is equal to a level of the second initialization voltage in the second frame, when a difference between the second cycle count value and the first cycle count value is less than '1', and wherein the level of the second initialization voltage in the second frame is lower than the level of the second initialization voltage in the first frame, when the difference between the second cycle count value and the first cycle count value is equal to or greater than '1'.

15. The display device of claim 14, wherein levels of the second initialization voltage in cycles of the second frame are equal to each other, when the difference between the second cycle count value and the first cycle count value is equal to or greater than '1'.

16. The display device of claim 14, wherein levels of the second initialization voltage in cycles of the second frame are reduced, when the difference between the second cycle count value and the first cycle count value is equal to or greater than '1'.

17. The display device of claim 3, wherein the plurality of driving voltages further includes a bias voltage, wherein the pixel circuit includes:

a driving transistor; and a bias transistor connected between a node between the driving transistor and a line which provides the first driving voltage, and a voltage line which provides the bias voltage, and wherein a level of the bias voltage or a time duration to apply the bias voltage is controlled through the compensating signal.

18. The display device of claim 17, wherein a level of a bias voltage in the first frame is equal to a level of a bias voltage in the second frame, when a difference between the second cycle count value and the first cycle count value is less than '1', and wherein the level of the bias voltage in the second frame is higher than the level of the bias voltage in the first frame, when the difference between the second cycle count value and the first cycle count value is equal to or greater than '1'.

19. The display device of claim 18, wherein levels of the bias voltage in cycles of the second frame are equal to each other or are increased, when the difference between the second cycle count value and the first cycle count value is equal to or greater than '1'.

20. The display device of claim 17, wherein a time duration to apply the bias voltage in the first frame is equal to a time duration to apply the bias voltage in the second frame, when a difference between the second cycle count value and the first cycle count value is less than '1', and wherein the time duration to apply the bias voltage in the second frame is longer than the time duration to apply the bias voltage in the first frame, when the difference between the second cycle count value and the first cycle count value is equal to or greater than '1'.

21. The display device of claim 1, wherein the driving controller includes:

a cycle counter which acquires the first cycle count value and the second cycle count value;

a look-up table having a compensating value stored based on the first cycle count value and the second cycle count value; and a compensating signal generator which generates the compensating signal, based on the compensating value.

22. A driving controller comprising:

a cycle counter which counts a cycle of each of a plurality of frames;

a look-up table having a compensating value stored based on a cycle count value provided from the cycle counter;

a computing unit; and a compensating signal generator which generates a compensating signal based on the compensating value, wherein the cycle counter:

acquires a first cycle count value by counting a cycle reference signal corresponding to a first period of a vertical synchronization signal for a first frame; and acquires a second cycle count value by counting a cycle reference signal corresponding to a second period of the vertical synchronization signal for a second frame immediately subsequent to the first frame, and the computing unit acquires a delta value by subtracting the first cycle count value from the second cycle count value.

23. The driving controller of claim 22, wherein the cycle counter:

outputs the first cycle count value and the second cycle count value.

24. The driving controller of claim 23, corresponding to the delta value is stored in the look-up table.

25. The driving controller of claim 23, wherein the compensating signal controls at least one of a light-emitting control signal, an initialization voltage, and a bias voltage provided to a display panel.

26. The driving controller of claim 25, wherein the compensating signal increases an off-duty ratio of the light-emitting control signal.

27. The driving controller of claim 25, wherein the compensating signal decreases a level of the initialization voltage.

28. The driving controller of claim 25, wherein the compensating signal increases a time duration to apply the initialization voltage.

29. The driving controller of claim 25, wherein the compensating signal increases a level of the bias voltage.

30. The driving controller of claim 25, wherein the compensating signal increases a time duration to apply the bias voltage.

31. An electronic device comprising: a display device comprising:

a display panel which displays an image of a first frame and a second frame immediately subsequent to the first frame, and receives at least one of a light-emitting control signal, an initialization voltage, and a bias voltage; and a driving controller which generates a compensating signal which controls brightness, when a second cycle count value, which is obtained by counting cycles included in the second frame, is greater than a first cycle count value obtained by counting cycles included in the first frame, wherein the compensating signal controls at least one of the light-emitting control signal, the initialization voltage, and the bias voltage.

32. The electronic device of claim 31, wherein the compensating signal is at least one of a signal which increases an off-duty ratio of the light-emitting control signal, a signal which decreases a level of the initialization voltage, a signal which increases a time duration to apply the initialization voltage, a signal which increases a level of the bias voltage, and a signal which increases a time duration to apply the bias voltage.

* * * * *